(12) United States Patent
Miyatake et al.

(10) Patent No.: US 9,135,873 B2
(45) Date of Patent: Sep. 15, 2015

(54) LIQUID CRYSTAL DISPLAY DEVICE

(71) Applicant: Japan Display Inc., Minato-ku (JP)

(72) Inventors: Masaki Miyatake, Tokyo (JP); Koji Yamamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 94 days.

(21) Appl. No.: 14/016,503

(22) Filed: Sep. 3, 2013

(65) Prior Publication Data

US 2014/0062984 A1  Mar. 6, 2014

(30) Foreign Application Priority Data

Sep. 4, 2012 (JP) .................................. 2012-194448

(51) Int. Cl.
*G09G 3/36* (2006.01)
*G02F 1/1343* (2006.01)

(52) U.S. Cl.
CPC .. *G09G 3/3614* (2013.01); *G02F 2001/134381* (2013.01); *G09G 2320/0209* (2013.01)

(58) Field of Classification Search
CPC .............. G09G 2310/0248; G09G 2310/0251; G09G 2310/0254; G09G 2310/0256
See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2006/0232539 A1* | 10/2006 | Hashimoto | 345/96 |
| 2007/0115234 A1 | 5/2007 | Kim et al. | |
| 2007/0166856 A1* | 7/2007 | Lee | 345/87 |
| 2008/0024404 A1* | 1/2008 | Tanaka et al. | 345/87 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2012/0229524 A1* | 9/2012 | Toshima et al. | 345/690 |
| 2013/0050628 A1* | 2/2013 | Takano et al. | 349/143 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2006-3877 | 1/2006 |

* cited by examiner

*Primary Examiner* — Kevin Nguyen
(74) *Attorney, Agent, or Firm* — Oblon, McClelland, Maier & Neustadt, L.L.P.

(57) ABSTRACT

According to one embodiment, a liquid crystal display device includes an array substrate, a counter-substrate, a liquid crystal layer and a signal line driver. The array substrate includes a signal line, a pixel electrode, and a thin-film transistor. The counter-substrate includes a common electrode. The signal line driver is configured to deliver video signals of a positive polarity and a negative polarity to the signal line. The signal line driver is configured to deliver, prior to delivering the video signals to the signal line, a precharge signal to the signal line in every 1 horizontal scanning period.

9 Claims, 20 Drawing Sheets

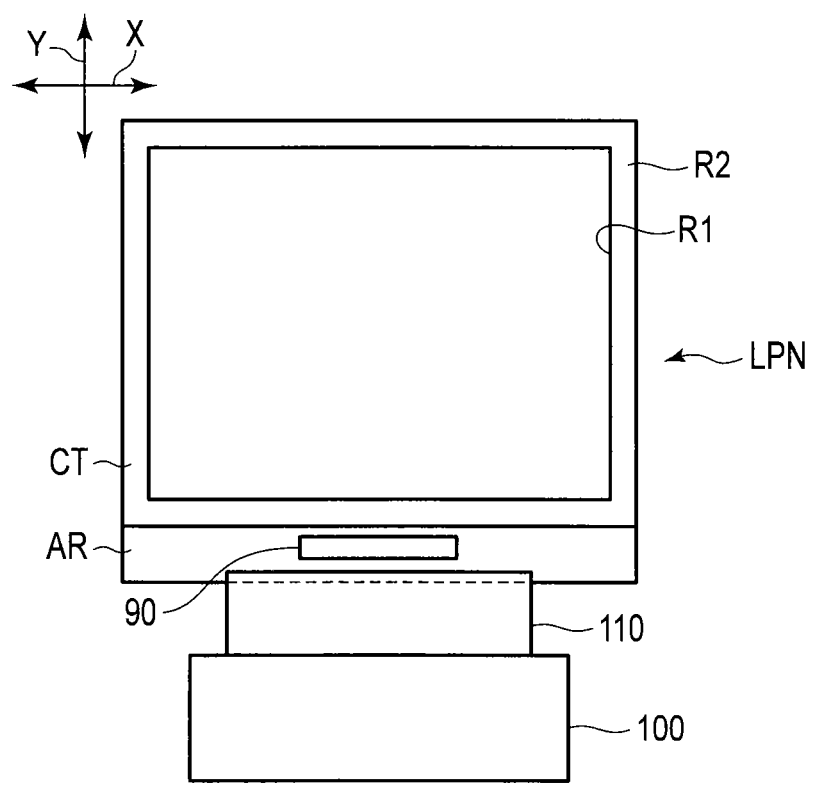
F I G. 1

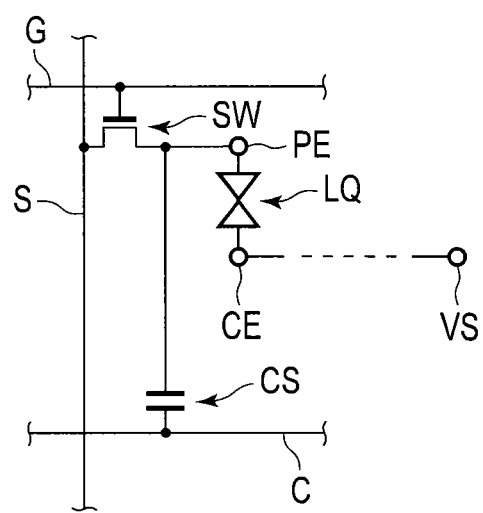
F I G. 3

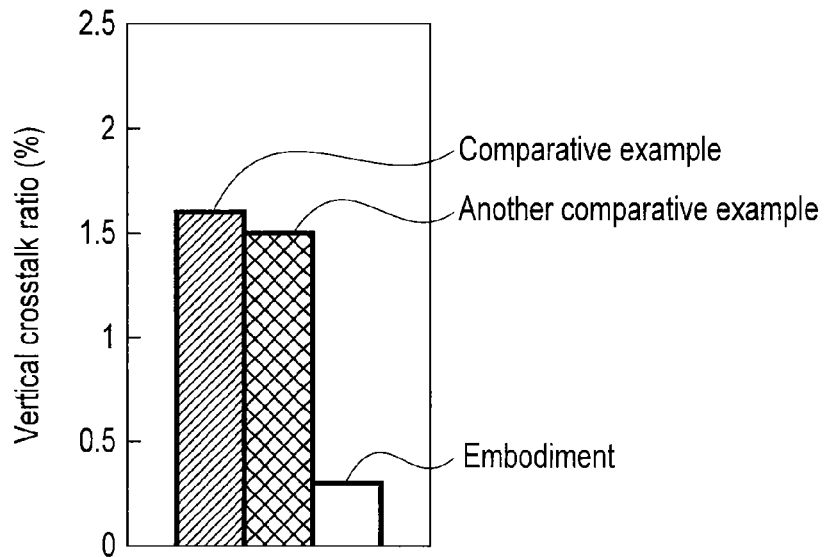
F I G. 1 2
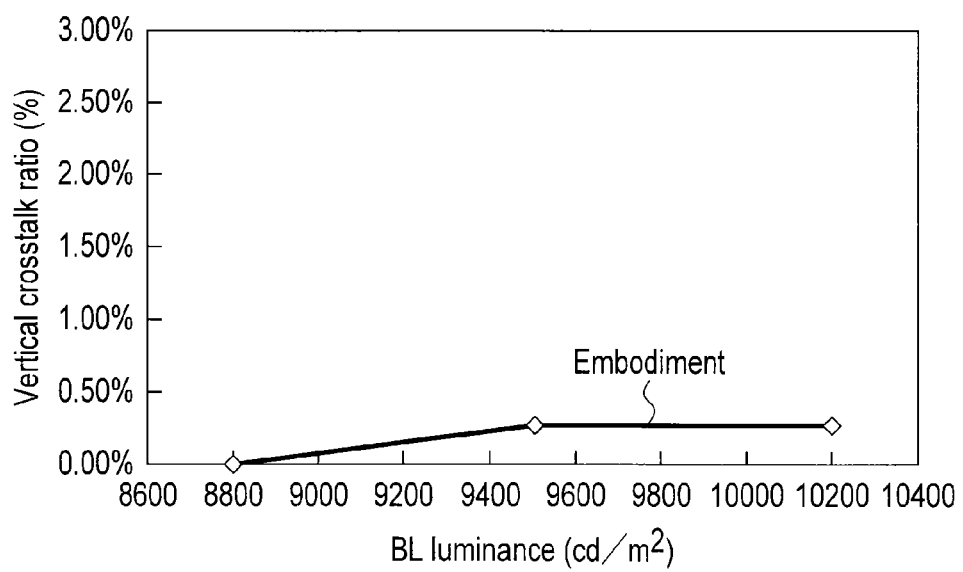
F I G. 1 3

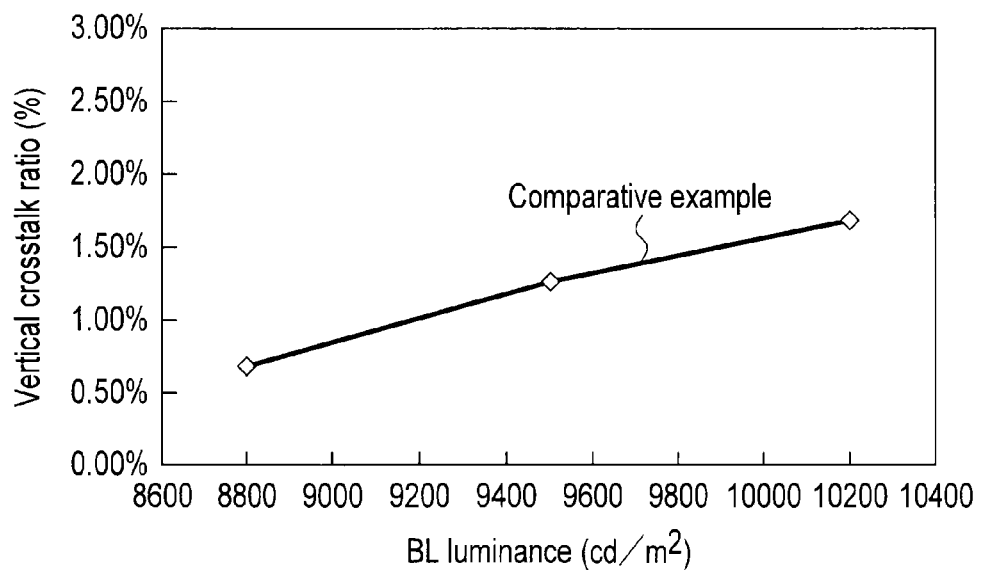
F I G. 1 4
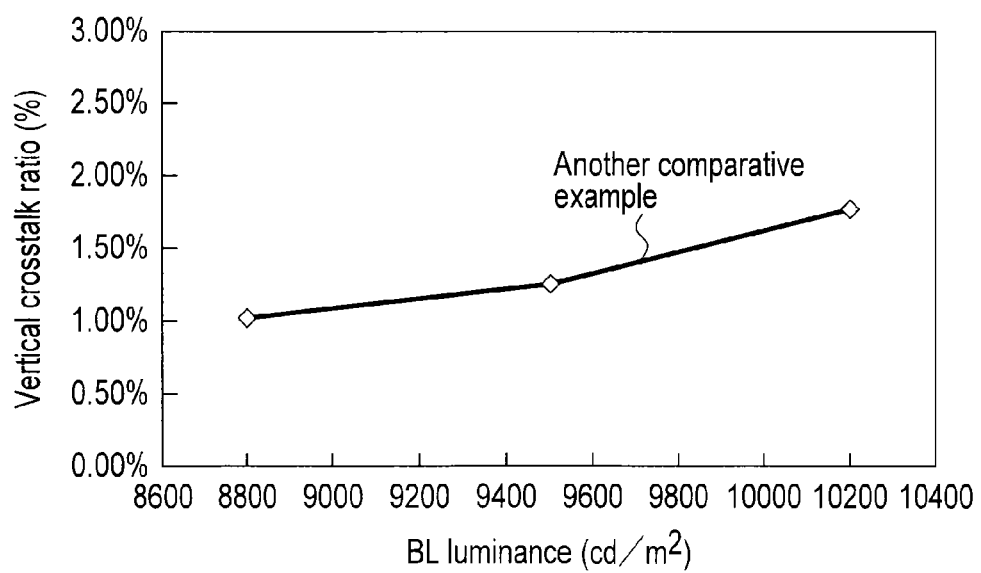
F I G. 1 5

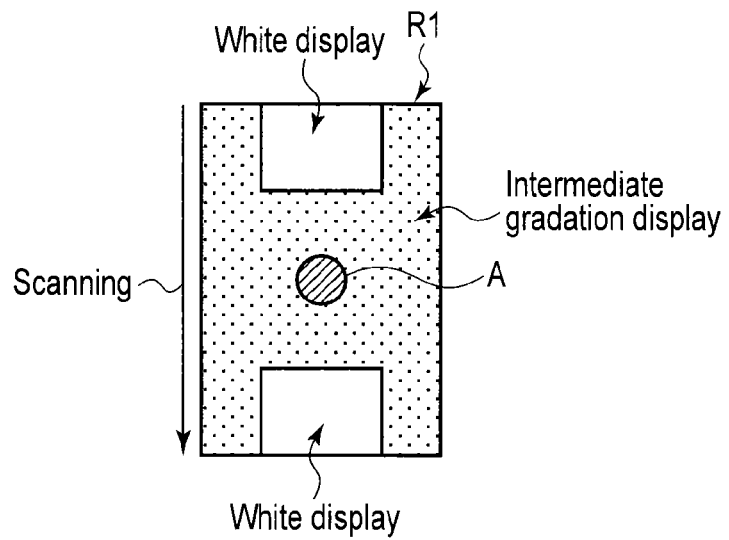
F I G. 1 6
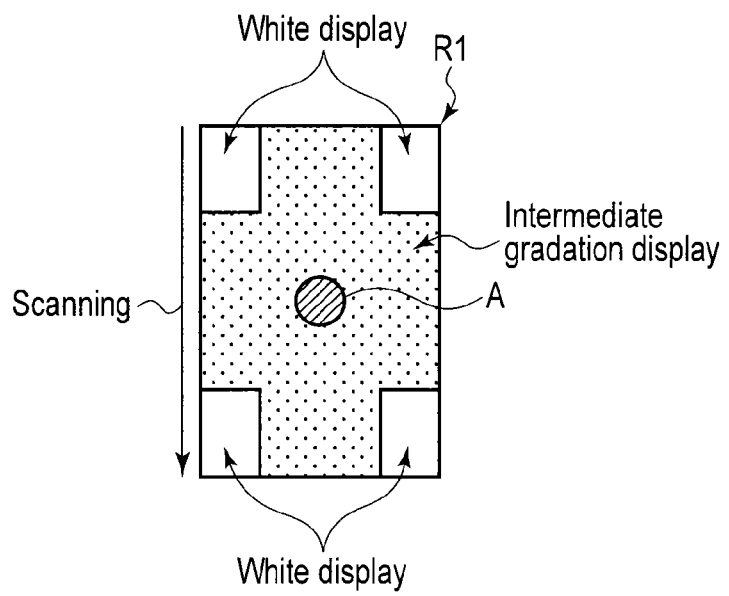
F I G. 1 7

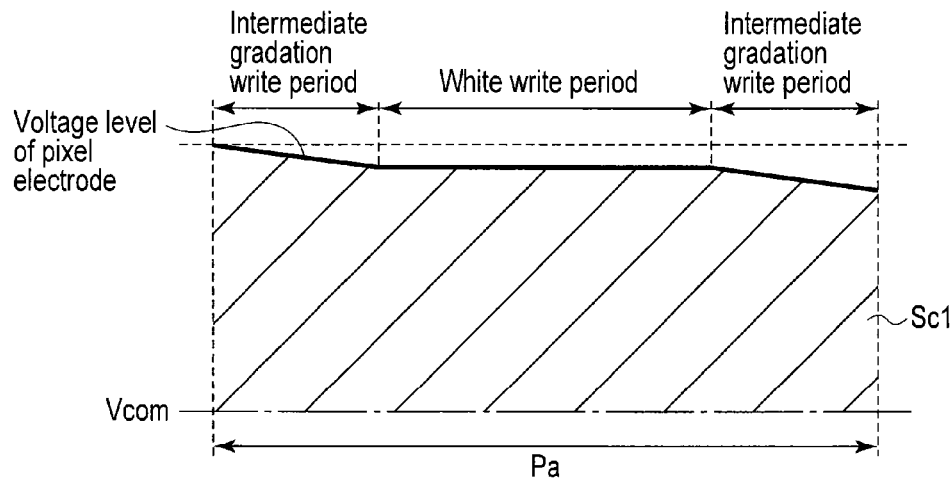
F I G. 18
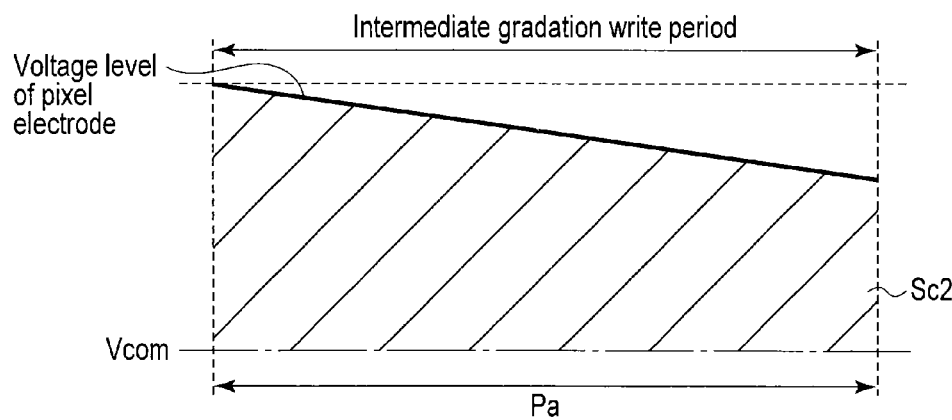
F I G. 19

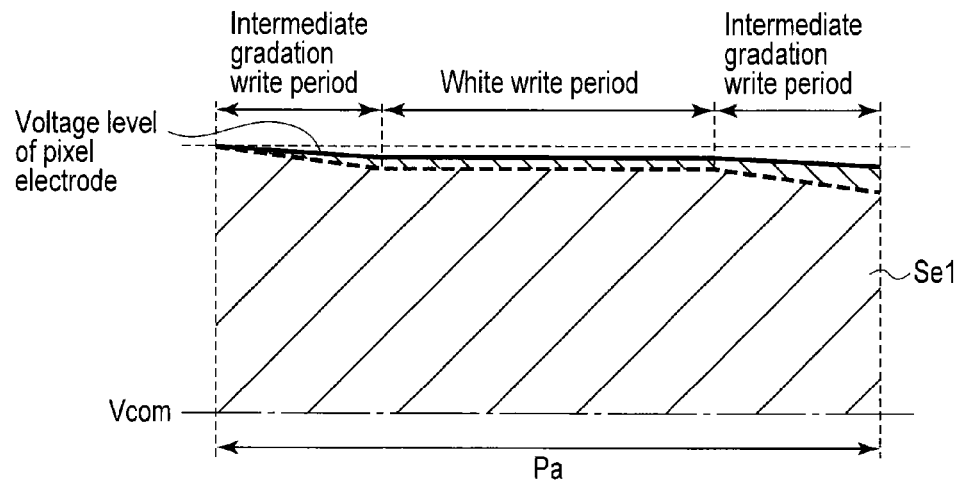
F I G. 20
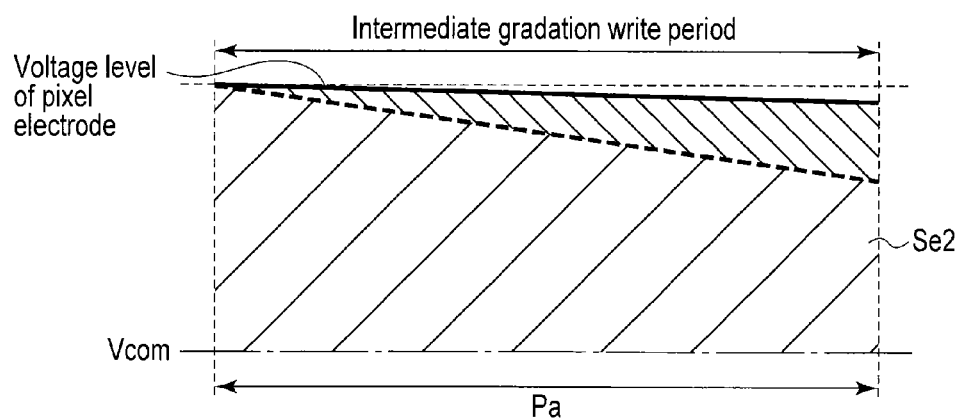
F I G. 21

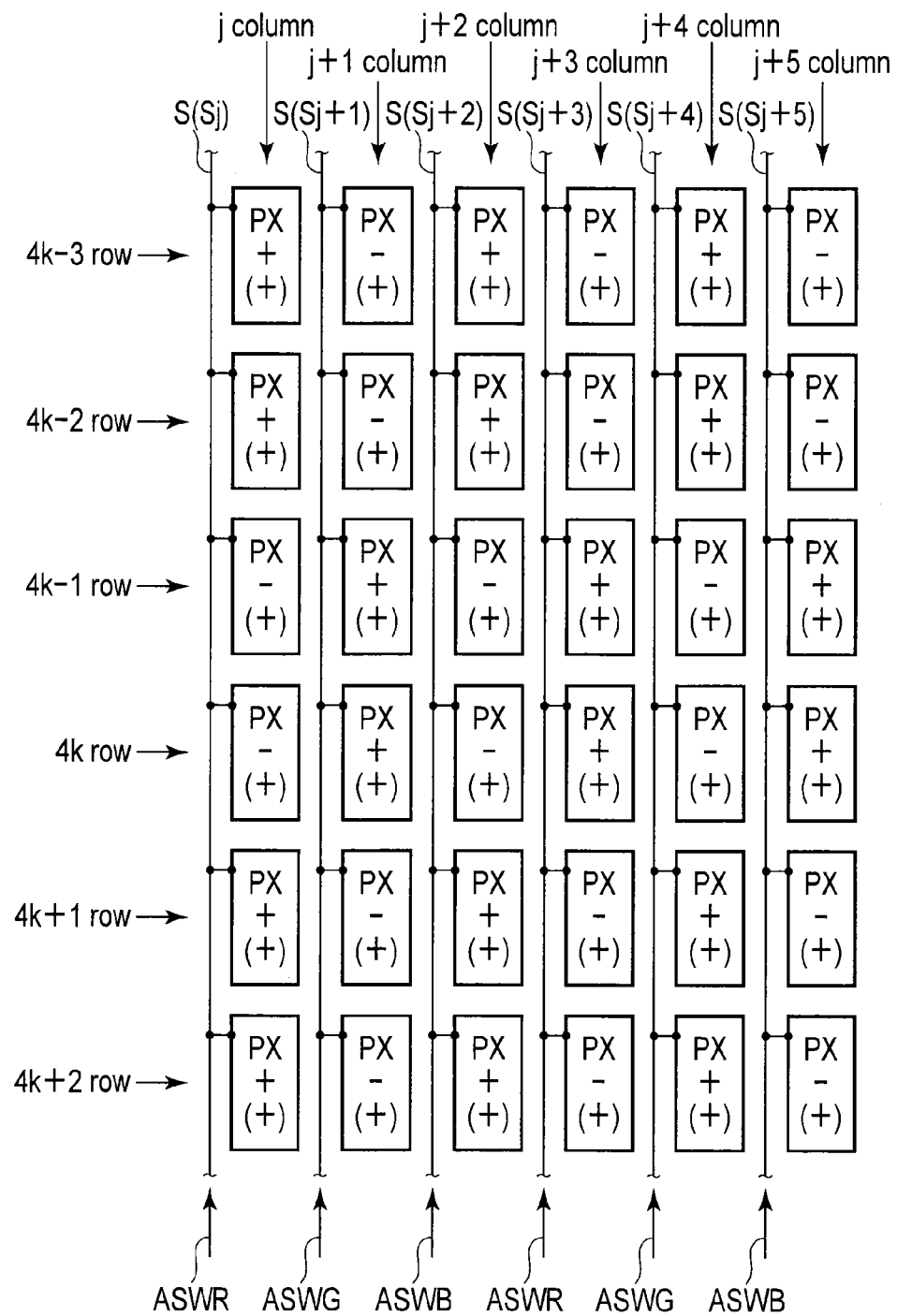
F I G. 23

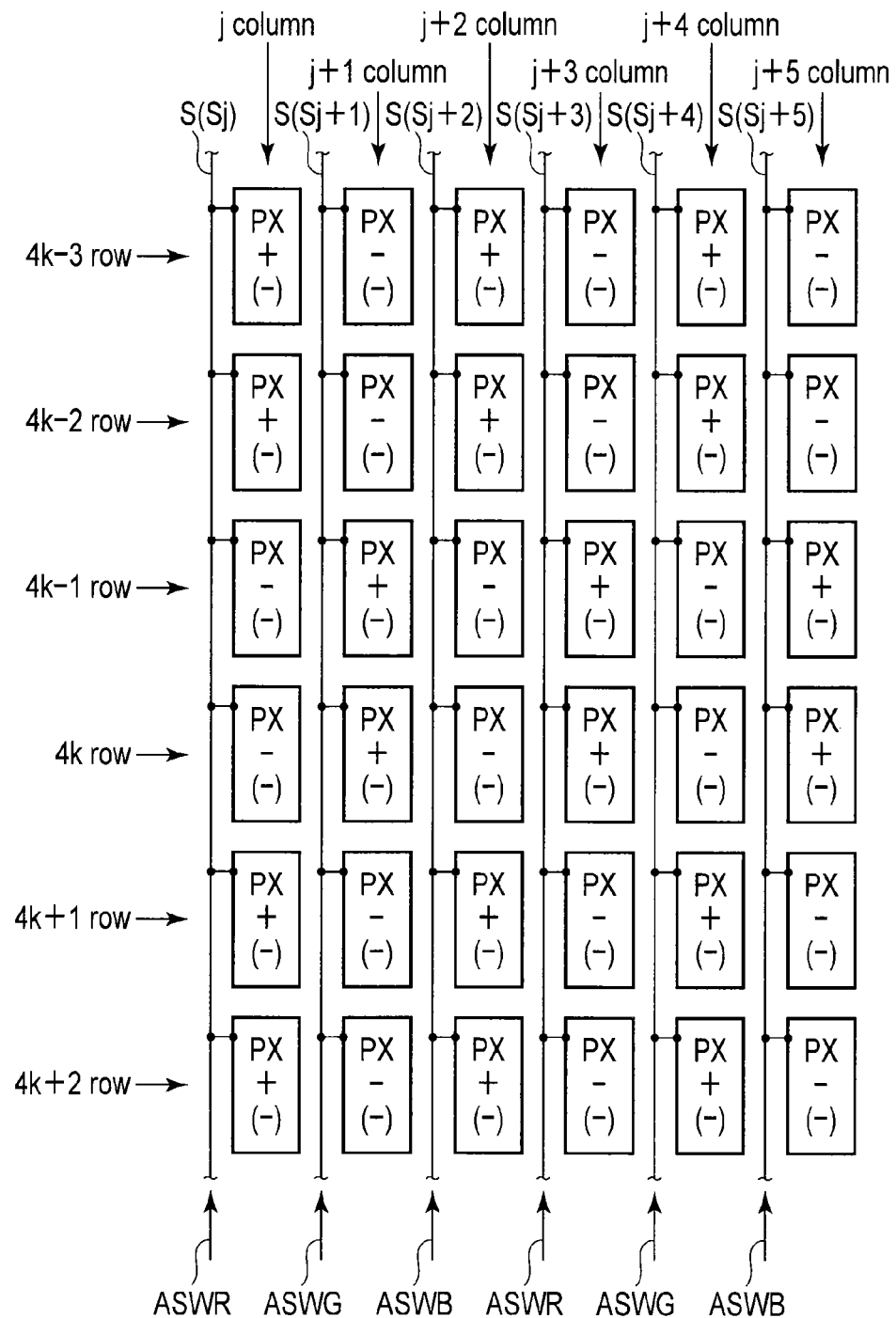
F I G. 24

LIQUID CRYSTAL DISPLAY DEVICE

CROSS-REFERENCE TO RELATED APPLICATIONS

This application is based upon and claims the benefit of priority from Japanese Patent Application No. 2012-194448, filed Sep. 4, 2012, the entire contents of which are incorporated herein by reference.

FIELD

Embodiments described herein relate generally to a liquid crystal display device.

BACKGROUND

In general, liquid crystal display devices have been used as image display devices. By virtue of such features as small thickness, light weight and low power consumption, the liquid crystal display devices have been used as displays for mobile phones, smartphones, PDAs (personal digital assistants) and personal computers. The liquid crystal display device comprises an array substrate, a counter-substrate which is arranged opposite to the array substrate, and a liquid crystal layer which is held between the array substrate and the counter-substrate. A plurality of scanning lines, a plurality of signal lines, a plurality of storage capacitance lines, a plurality of TFTs (thin-film transistors) for pixel switching, and a plurality of storage capacitance elements are provided in the array substrate.

Capacitance coupled driving (CC driving) has been proposed for the liquid crystal display device. In the CC driving, the potential of the storage capacitance line is varied, and a superimposition voltage is applied to the pixel electrode via the storage capacitance element. By adopting the CC driving, the amplitude (voltage value) of a video signal, which is applied to the signal line, can be reduced.

In addition, dot-reversal driving has been proposed for the liquid crystal display device. By adopting the dot-reversal driving, the occurrence of lateral crosstalk can be reduced.

BRIEF DESCRIPTION OF THE DRAWINGS

FIG. 1 is a view which schematically shows the structure of a liquid crystal display device according to an embodiment.

FIG. 3 is an equivalent circuit diagram illustrating a pixel shown in FIG. 2.

FIG. 12 is a graph showing vertical crosstalk ratios of the liquid crystal display device according to the embodiment, the liquid crystal display device of the comparative example, and a liquid crystal display device of another comparative example.

FIG. 13 is a graph showing a variation of a vertical crosstalk ratio relative to BL luminance in the liquid crystal display device of the embodiment.

FIG. 14 is a graph showing a variation of a vertical crosstalk ratio relative to BL luminance in the liquid crystal display device of the comparative example.

FIG. 15 is a graph showing a variation of a vertical crosstalk ratio relative to BL luminance in the liquid crystal display device of the another comparative example.

FIG. 16 is a view for explaining the definition of the crosstalk ratio which is introduced in the embodiment.

FIG. 17 is another view for explaining the definition of the crosstalk ratio which is introduced in the embodiment.

FIG. 18 is a graph showing a variation of a voltage level of a pixel electrode at a measurement location A on a vertical crosstalk measurement screen of the liquid crystal display device of the another comparative example.

FIG. 19 is a graph showing a variation of a voltage level of a pixel electrode at a measurement location A on a reference screen of the liquid crystal display device of the another comparative example.

FIG. 20 is a graph showing a variation of a voltage level of a pixel electrode at a measurement location A on a vertical crosstalk measurement screen of the liquid crystal display device of the embodiment.

FIG. 21 is a graph showing a variation of a voltage level of a pixel electrode at a measurement location A on a reference screen of the liquid crystal display device of the embodiment.

FIG. 23 is a schematic view illustrating another modification of the 2H1V reverse driving which is adopted by the liquid crystal display device of the embodiment, and illustrating another modification of the polarities of precharge signals.

FIG. 24 is a schematic view illustrating another modification of the 2H1V reverse driving which is adopted by the liquid crystal display device of the embodiment, and illustrating another modification of the polarities of precharge signals.

DETAILED DESCRIPTION

Figure 2:
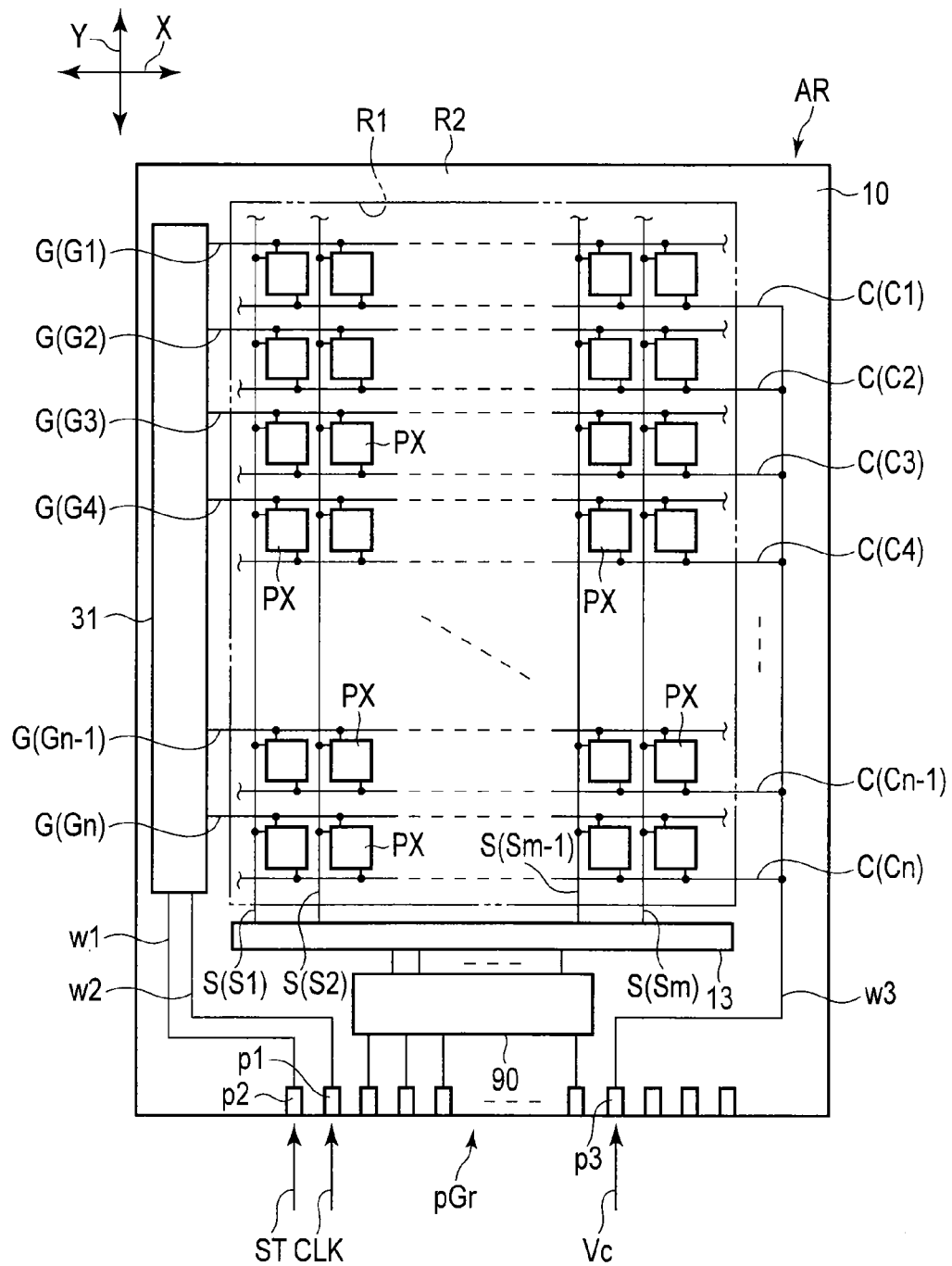
FIG. 2 is a plan view which shows a schematic structure of an array substrate shown in FIG. 1.

In general, according to one embodiment, there is provided a liquid crystal display device comprising: an array substrate comprising a signal line, a pixel electrode, and a thin-film transistor including a semiconductor layer including a source region electrically connected to the signal line and a drain region electrically connected to the pixel electrode; a counter-substrate comprising a common electrode which is set at a constant potential, the counter-substrate being arranged opposite to the array substrate with a gap; a liquid crystal layer which is held between the array substrate and the counter-substrate and on which an electric field produced between the pixel electrode and the common electrode acts; and a signal line driver which is electrically connected to the signal line, and is configured to deliver video signals of a positive polarity and a negative polarity to the signal line, and execute HV (horizontal and vertical) reverse driving. The signal line driver is configured to deliver, prior to delivering the video signals to the signal line, a precharge signal to the signal line in every 1 horizontal scanning period, the precharge signal having a voltage level which is different from an intermediate voltage value between the video signal of the positive polarity and the video signal of the negative polarity.

According to another embodiment, there is provided a liquid crystal display device comprising: an array substrate comprising first to third signal lines, first to third pixel electrodes, a first thin-film transistor including a first semiconductor layer including a source region electrically connected to the first signal line and a drain region electrically connected to the first pixel electrode, a second thin-film transistor including a second semiconductor layer including a source region electrically connected to the second signal line and a drain region electrically connected to the second pixel electrode, and a third thin-film transistor including a third semiconductor layer including a source region electrically connected to the third signal line and a drain region electrically connected to the third pixel electrode; a counter-substrate comprising a common electrode which is set at a constant potential, the counter-substrate being arranged opposite to the array substrate with a gap; a liquid crystal layer which is held between the array substrate and the counter-substrate and on which an electric field produced between the first to third pixel electrodes and the common electrode acts; and a signal line driver which is electrically connected to the first to third signal lines, and is configured to deliver first video signals of a positive polarity and a negative polarity to the first signal line, deliver second video signals of the positive polarity and the negative polarity to the second signal line, deliver third video signals of the positive polarity and the negative polarity to the third signal line, and execute HV (horizontal and vertical) reverse driving. In every 1 horizontal scanning period, the signal line driver is configured to: simultaneously deliver, prior to delivering the first to third video signals to the first to third signal lines, precharge signals of the same polarity to the first to third signal lines, the precharge signals having a voltage level which is different from an intermediate voltage value between the first to third video signals of the positive polarity and the first to third video signals of the negative polarity; deliver the first video signal to the first signal line after delivering the precharge signals; deliver the second video signal to the second signal line after delivering the first video signal to the first signal line; and deliver the third video signal to the third signal line after delivering the second video signal to the second signal line.

Next, a liquid crystal display device according to an embodiment will be described in detail with reference to the accompanying drawings. FIG. 1 is a view which schematically shows the structure of the liquid crystal display device according to the embodiment. FIG. 2 is a plan view which shows a schematic structure of an array substrate AR shown in FIG. 1. FIG. 3 is an equivalent circuit diagram illustrating a pixel PX shown in FIG. 2.

As shown in FIG. 1 to FIG. 3, the liquid crystal display device comprises an active-matrix-type liquid crystal display panel LPN. The liquid crystal display panel LPN comprises an array substrate AR which is a first substrate, a counter-substrate CT which is a second substrate arranged opposite to the array substrate AR with a predetermined gap therebetween, and a liquid crystal layer LQ which is held between the array substrate AR and the counter-substrate CT. In addition, the liquid crystal display device includes a signal line driver 90 functioning as a video signal output module, a controller 100, and an FPC (flexible printed circuit) 110. The liquid crystal display panel LPN includes a display region R1 which displays an image.

The display region R1 opposes the array substrate AR, counter-substrate CT and liquid crystal layer LQ. In the display region R1, a plurality of pixels PX are located between the array substrate AR and counter-substrate CT. The plural pixels PX are arrayed in a matrix of m×n (m and n are natural numbers) in a column direction Y and a row direction X.

In a non-display region R2 on the outside of the display region R1, a switching circuit 13, a scanning line driver 31 and an outer lead bonding pad group (hereinafter referred to as "OLB pad group") pGr are provided in the array substrate AR side.

The liquid crystal display panel LPN comprises, in the display area R1, an n-number of scanning lines G (G1 to Gn), an n-number of storage capacitance lines C (C1 to Cn), and an m-number of signal lines S (S1 to Sm). The scanning lines G and storage capacitance lines C extend, for example, substantially linearly in the row direction X. These scanning lines G and storage capacitance lines C are alternately arranged in parallel along the column direction Y which crosses the row direction X. In this embodiment, the row direction X and column direction Y are substantially perpendicular to each other.

The signal lines S cross the scanning lines G and storage capacitance lines C. The signal lines S extend substantially linearly in the column direction Y. In the meantime, it is not always necessary that the scanning lines G, storage capacitance lines C and signal lines S extend linearly, and a part thereof may be bent. The scanning lines G, storage capacitance lines C and signal lines S are led out of the display region R1.

Each of the pixels PX includes a switching element SW, a pixel electrode PE and a common electrode CE. A storage capacitance CS is formed, for example, between the storage capacitance line C and the pixel electrode PE which is arranged opposite to the storage capacitance line C via an insulation film. In this case, the storage capacitance line C and pixel electrode PE form a storage capacitance element.

Alternatively, the storage capacitance CS is formed between the storage capacitance line C and a storage capacitance electrode (not shown) which is arranged opposite to the storage capacitance line C via an insulation film and is connected to the pixel electrode PE. In this case, the storage capacitance line C and the storage capacitance electrode form a storage capacitance element.

In the meantime, in the present embodiment, the liquid crystal display panel LPN is configured such that the pixel electrode PE is provided in the array substrate AR, and at least a part of the common electrode CE is provided in the counter-substrate CT, and liquid crystal molecules of the liquid crystal layer LQ are switched by mainly using an electric field which is produced between the pixel electrode PE and the common electrode CE. The electric field, which is produced between the pixel electrode PE and the common electrode CE, is an oblique electric field which is slightly inclined to an X-Y plane or a substrate major surface, which is defined by the row direction X and column direction Y (or a lateral electric field which is substantially parallel to the substrate major surface).

The switching element SW is composed of, for example, an n-channel thin-film transistor (TFT). The switching element SW is electrically connected to the scanning line G and signal line S. The switching element SW may be of a top-gate-type TFT, or a bottom-gate-type TFT. In addition, although a semiconductor layer of the switching element SW is formed of, for example, polysilicon, it may be formed of amorphous silicon.

The pixel electrode PE is disposed in each pixel PX, and is electrically connected to the switching element SW. The common electrode CE is disposed common to pixel electrodes PE of plural pixels PX via the liquid crystal layer LQ. The pixel electrodes PE and common electrode CE are formed of an electrically conductive material with light transmissivity, such as indium tin oxide (ITO) or indium zinc oxide (IZO), but these may be formed of other metallic material such as aluminum.

The array substrate AR comprises a power supply module VS for applying a voltage (common voltage) to the common electrode CE. The power supply module VS is provided, for example, in the non-display region R2. The common electrode CE is led out to the outside of the display region R1, and is electrically connected to the power supply module VS via an electrically conductive member (not shown).

Figure 4:
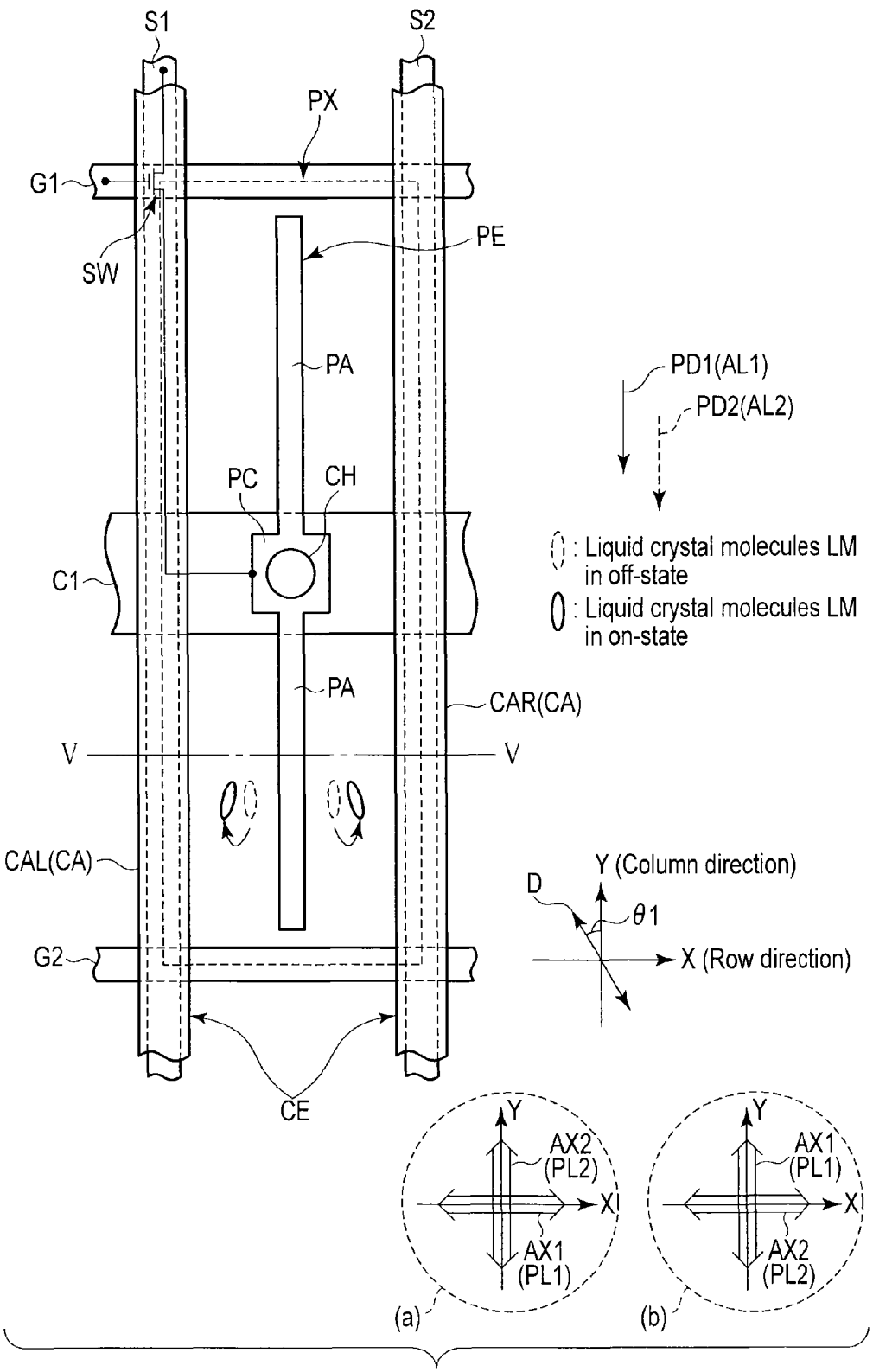
FIG. 4 is a plan view which schematically shows a structure example of a pixel at a time when a liquid crystal display panel shown in FIG. 1 is viewed from a counter-substrate side.

FIG. 4 is a plan view which schematically shows a structure example of one pixel PX at a time when the liquid crystal display panel LPN shown in FIG. 1 is viewed from the counter-substrate CT side. FIG. 4 is a plan view in the X-Y plane.

As shown in FIG. 4, the pixel PX has a rectangular shape having a less length in the row direction X than in the column direction Y, as indicated by a dashed line. In this embodiment, the pixel PX has a major axis which is parallel to the column direction Y. The pixel PX, however, is not limited to this embodiment, and it should suffice if the pixel PX has a major axis which is parallel to the column direction or the row direction.

The scanning line G1 and scanning line G2 extend in the row direction X. The storage capacitance line C1 is disposed between the neighboring scanning line G1 and scanning line G2, and extends in the row direction X. The width of the storage capacitance line C1 is, for example, 15.5 µm. The signal line S1 and signal line S2 extend in the column direction Y. The pixel electrode PE is disposed between the neighboring signal line S1 and signal line S2. In addition, the pixel electrode PE is located between the scanning line G1 and scanning line G2.

In the example illustrated, in the pixel PX, the signal line S1 is disposed at a left side end portion, and the signal line S2 is disposed at a right side end portion. Strictly speaking, the signal line S1 is disposed to extend over a boundary between the pixel PX and a pixel neighboring on the left side, and the signal line S2 is disposed to extend over a boundary between the pixel PX and a pixel neighboring on the right side. In addition, in the pixel PX, the scanning line G1 is disposed at an upper side end portion, and the scanning line G2 is disposed at a lower side end portion. Strictly speaking, the scanning line G1 is disposed to extend over a boundary between the pixel PX and a pixel neighboring on the upper side, and the scanning line G2 is disposed to extend over a boundary between the pixel PX and a pixel neighboring on the lower side. The storage capacitance line C1 is disposed at a substantially central part of the pixel.

The switching element SW in the illustrated example is electrically connected to the scanning line G1 and signal line S1. The switching element SW is provided at an intersection between the scanning line G1 and signal line S1. A drain line of the switching element SW is formed to extend along the signal line S1 and storage capacitance line C1, and is electrically connected to the pixel electrode PE via a contact hole CH which is formed at an area overlapping the storage capacitance line C1. The switching element SW is provided in an area opposing the signal line S1 and storage capacitance line C1, and does not substantially protrude from the area opposing the signal line S1 and storage capacitance line C1, thus suppressing a decrease in area of an aperture portion which contributes to display.

The pixel electrodes PE are arranged at intervals in the row direction X and column direction Y. Each of the pixel electrodes PE includes a primary pixel electrode PA extending in a direction along the major axis of the pixel PX. In this embodiment, the primary pixel electrode PA is formed to extend in the column direction Y.

In addition, in the embodiment, the pixel electrode PE includes the primary pixel electrode PA and a contact portion PC which are electrically connected to each other. The primary pixel electrode PA linearly extends in the column direction Y from the contact portion PC to the vicinity of the upper side end portion of the pixel PX and to the vicinity of the lower side end portion of the pixel PX. The primary pixel electrode PA is formed in a strip shape having a substantially uniform width in the row direction X. The contact portion PC is located at an area overlapping the storage capacitance line C1, and is electrically connected to the switching element SW via the contact hole CH. The contact portion PC is formed to have a greater width than the primary pixel electrode PA.

The pixel electrode PE is located at a substantially middle point between the signal line S1 and signal line S2, that is, at the center of the pixel PX. The distance in the row direction X between the signal line S1 and pixel electrode PE is substantially equal to the distance in the row direction X between the signal line S2 and pixel electrode PE.

The common electrode CE includes a plurality of primary common electrodes CA which are provided in the counter-substrate CT side. A pair of primary common electrodes CA are located on both sides of the primary pixel electrode PA in a direction perpendicular to the major axis of the pixel PX, and extend in a direction along the major axis of the pixel PX.

In the embodiment, the plural primary common electrodes CA, in the X-Y plane, are arranged at intervals in the row direction X, sandwich plural primary pixel electrodes PA in the row direction X, and linearly extend in the column direction Y which is substantially parallel to the primary pixel electrodes PA. Alternatively, the primary common electrodes CA are opposed to the signal lines S, respectively, and extend substantially in parallel to the primary pixel electrodes PA.

The primary common electrode CA is formed in a belt shape and has a substantially uniform width in the row direction X.

In the example illustrated, two primary common electrodes CA are arranged in parallel along the row direction X, and are disposed at the left and right end portions of the pixel PX, respectively. In the description below, in order to distinguish these primary common electrodes CA, the primary common electrode on the left side in the Figure is referred to as "CAL", and the primary common electrode on the right side in the Figure is referred to as "CAR". The primary common electrode CAL is opposed to the signal line S1, and the primary common electrode CAR is opposed to the signal line S2.

In the pixel PX, the primary common electrode CAL is disposed at a left side end portion, and the primary common electrode CAR is disposed at a right side end portion. Strictly speaking, the primary common electrode CAL is disposed to extend over a boundary between the pixel PX and a pixel neighboring on the left side, and the primary common electrode CAR is disposed to extend over a boundary between the pixel PX and a pixel neighboring on the right side.

Paying attention to the positional relationship between the pixel electrode PE and the primary common electrodes CA, the pixel electrode PE and the primary common electrodes CA are alternately arranged in the row direction X. The pixel electrode PE and the primary common electrodes CA are arranged substantially in parallel to each other. In this case, in the X-Y plane, neither of the primary common electrodes CA opposes the pixel electrode PE.

Specifically, one pixel electrode PE is located between the neighboring primary common electrode CAL and primary common electrode CAR. In other words, a pair of primary common electrodes (primary common electrode CAL and primary common electrode CAR) are disposed on both sides of a position immediately above the pixel electrode PE. Alternatively, the pixel electrode PE is disposed between the primary common electrode CAL and primary common electrode CAR. Thus, the primary common electrode CAL, primary pixel electrode PA and primary common electrode CAR are arranged in the named order in the row direction X.

The distance in the row direction X between the pixel electrode PE and the common electrode CE is substantially uniform. Specifically, the distance in the row direction X between the primary common electrode CAL and the primary pixel electrode PA is substantially equal to the distance in the row direction X between the primary common electrode CAR and the primary pixel electrode PA.

Figure 5:
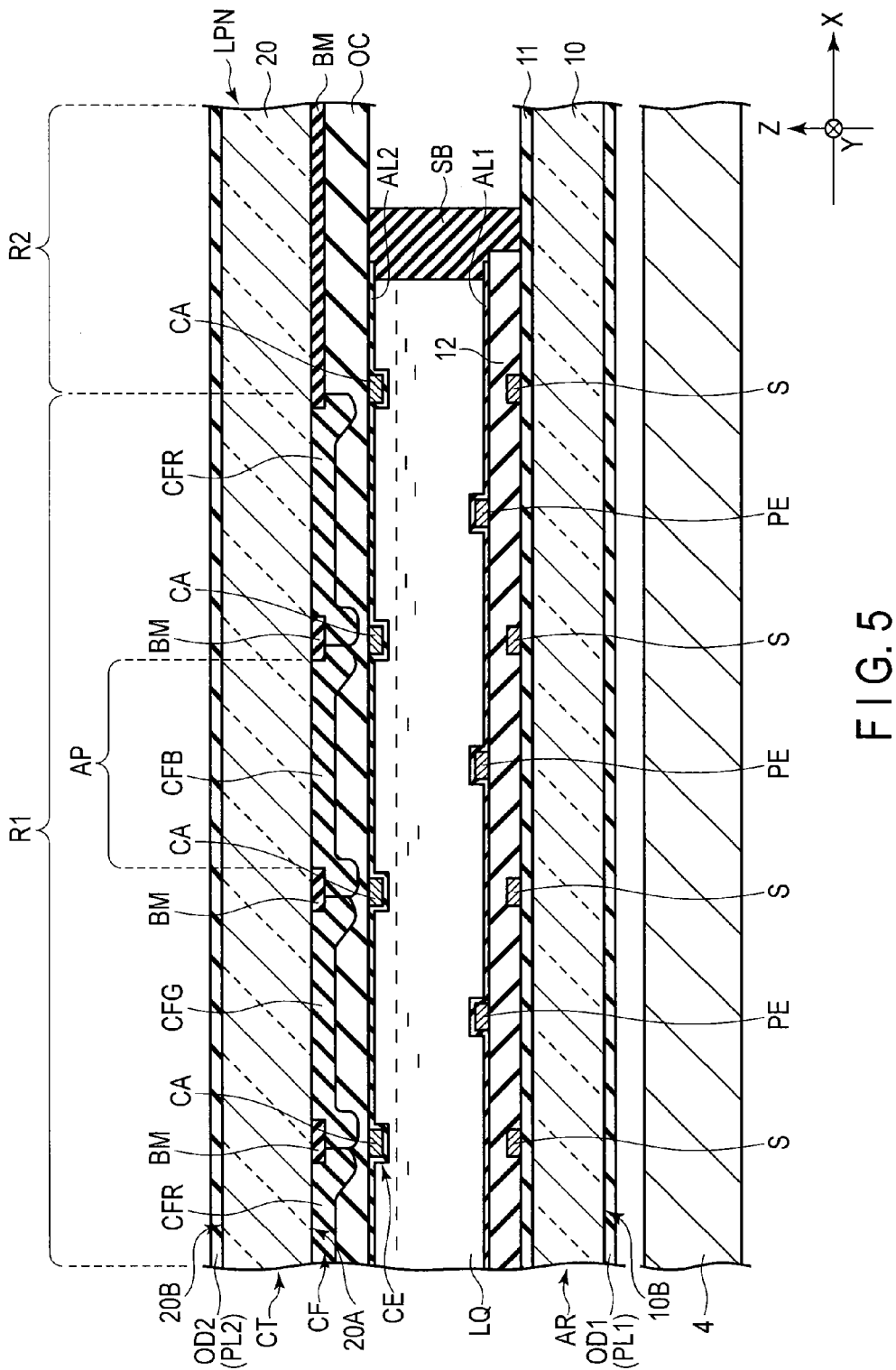
FIG. 5 is a schematic cross-sectional view, taken along line V-V in FIG. 4, showing a cross-sectional structure of the liquid crystal display panel shown in FIG. 4.

FIG. 5 is a schematic cross-sectional view, taken along line V-V in FIG. 4, showing a cross-sectional structure of the liquid crystal display panel LPN shown in FIG. 4. FIG. 5 shows only the parts which are necessary for the description.

As shown in FIG. 5, a backlight unit 4 is disposed on the back side of the array substrate AR which constitutes the liquid crystal display panel LPN. As the backlight unit 4, various modes are applicable, and use may be made of either a backlight unit which utilizes a light-emitting diode (LED) as a light source, or a backlight unit which utilizes a cold cathode fluorescent lamp (CCFL) as a light source. A description of the detailed structure of the backlight unit 4 is omitted.

The array substrate AR is formed by using a first insulative substrate 10 having light transmissivity. Signal lines S are provided on a first interlayer insulation film 11, and are covered with a second interlayer insulation film 12. Scanning lines and storage capacitance lines, which are not shown, are disposed, for example, between the first insulative substrate 10 and the first interlayer insulation film 11. Pixel electrodes PE are provided on the second interlayer insulation film 12. Each pixel electrode PE is located on the inside of a position immediately above each of neighboring signal lines S.

A first alignment film AL1 is disposed on that surface of the array substrate AR, which is opposed to the counter-substrate CT, and the first alignment film AL1 extends over substantially the entirety of the display region R1. The first alignment film AL1 covers the pixel electrode PE, etc., and is also disposed over the second interlayer insulation film 12. In the present embodiment, the first alignment film AL1 is formed of a material which exhibits horizontal alignment properties.

In the meantime, the array substrate AR may further include a part of the common electrode CE.

The counter-substrate CT is formed by using a second insulative substrate 20 having light transmissivity. The counter-substrate CT comprises a black matrix BM, a color filter CF, an overcoat layer OC, a common electrode CE, and a second alignment film AL2.

The black matrix BM partitions the pixels PX and forms aperture portions AP which are opposed to the pixel electrodes PE. Specifically, the black matrix BM is disposed so as to be opposed to wiring portions, such as the signal lines S, scanning lines, storage capacitance lines, and switching elements. In this example, only those portions of the black matrix BM, which extend in the column direction Y, are depicted, but the black matrix BM may include portions extending in the row direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends on the black matrix BM. Color filters CF, which are disposed in the pixels PX neighboring in the row direction X, have mutually different colors. For example, the color filters CF are formed of resin materials which are colored in three primary colors of red, blue and green.

A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions opposing the black matrix BM. In the present embodiment, a pixel PX in a j column is a red pixel, a pixel PX of a j+1 column is a green pixel, and a pixel PX of a j+2 column is a blue pixel.

The overcoat layer OC covers the color filters CF. The overcoat layer OC reduces the effect of asperities on the surface of the color filters CF.

The common electrode CE is provided on that side of the overcoat layer OC, which is opposed to the array substrate AR. The distance in a vertical direction Z between the common electrode CE and pixel electrode PE is substantially uniform. The vertical direction Z is a direction perpendicular to the row direction X and column direction Y, or a normal direction to the liquid crystal display panel LPN.

The second alignment film AL2 is disposed on that surface of the counter-substrate CT, which is opposed to the array substrate AR, and the second alignment film AL2 extends over substantially the entirety of the display region R1. The second alignment film AL2 covers the common electrode CE and overcoat layer OC. In the embodiment, the second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, and a second alignment treatment direction PD2, in which the second alignment film AL2 initially aligns the liquid crystal molecules, are parallel to each other, and are opposite or identical to each other. For example, as shown in FIG. 4, the first alignment treatment direction PD1 and second alignment treatment direction PD2 are substantially parallel to the column direction Y and are identical.

In the present embodiment, the first alignment film AL1 and second alignment film AL2 can initially align the nearby liquid crystal molecules in the column direction Y.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are bonded by a sealant SB on the outside of the display region R1 in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is formed of, for example, a p-type liquid crystal material which has a positive dielectric anisotropy.

The distance in the row direction X between the primary pixel electrode PA and primary common electrode CA is greater than the thickness (cell gap) of the liquid crystal layer LQ, and the distance between the primary pixel electrode PA and primary common electrode CA is double or more the thickness (cell gap) of the liquid crystal layer LQ.

A first optical element OD1 is attached, by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1.

A second optical element OD2 is attached, by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2.

Since the first polarization axis AX1 and the second polarization axis AX2 have, for example, an orthogonal positional relationship, the first polarizer PL1 and second polarizer PL2 are disposed in a positional relationship of crossed Nicols. In this case, one of the polarizers is disposed such that the polarization axis thereof is parallel or perpendicular to an initial alignment direction of liquid crystal molecules, that is, the first alignment treatment direction PD1 or second alignment treatment direction PD2. When the initial alignment direction is parallel to the column direction Y, the polarization axis of one polarizer is parallel to the column direction Y or is parallel to the row direction X.

In an example shown in part (a) of FIG. 4, the first polarizer PL1 is disposed such that the first polarization axis AX1 thereof is perpendicular to the initial alignment direction (column direction Y) of liquid crystal molecules LM (i.e. parallel to the row direction X), and the second polarizer PL2 is disposed such that the second polarization axis AX2 thereof is parallel to the initial alignment direction of liquid crystal molecules LM (i.e. parallel to the column direction Y).

In addition, in an example shown in part (b) of FIG. 4, the second polarizer PL2 is disposed such that the second polarization axis AX2 thereof is perpendicular to the initial alignment direction (column direction Y) of liquid crystal molecules LM (i.e. parallel to the row direction X), and the first polarizer PL1 is disposed such that the first polarization axis AX1 thereof is parallel to the initial alignment direction of liquid crystal molecules LM (i.e. parallel to the column direction Y).

Next, the operation of the liquid crystal display panel LPN having the above-described structure is described.

As shown in FIG. 4 and FIG. 5, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the column direction Y. At the OFF time, the liquid crystal molecule LM is initially aligned such that the major axis thereof is substantially parallel to the column direction Y, as indicated by a dashed line in FIG. 4. Specifically, the initial alignment direction of the liquid crystal molecule LM is parallel to the column direction Y (or 0° to the column direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment).

As a result of alignment treatment of the first alignment film AL1 in the first alignment treatment direction PD1, the liquid crystal molecules LM in the vicinity of the first alignment film AL1 are initially aligned in the first alignment treatment direction PD1, and as a result of alignment treatment of the second alignment film AL2 in the second alignment treatment direction PD2, the liquid crystal molecules LM in the vicinity of the second alignment film AL2 are initially aligned in the second alignment treatment direction PD2. When the first alignment treatment direction PD1 and the second alignment treatment direction PD2 are parallel and identical to each other, the liquid crystal molecules LM are splay-aligned, as described above, and the alignment of the liquid crystal molecules LM in the vicinity of the first alignment film AL1 on the array substrate AR and the alignment of the liquid crystal molecules LM in the vicinity of the second alignment film AL2 on the counter-substrate CT become vertically symmetric, with the middle part of the liquid crystal layer LQ as the boundary, as described above. Thus, optical compensation can be made even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of backlight from the backlight unit 4 passes through the first polarizer PL1 and enters the liquid crystal display panel LPN. The polarization state of the light, which enters the liquid crystal display panel LPN, varies depending on the alignment state of the liquid crystal molecules LM at a time when the light passes through the liquid crystal layer LQ. At the OFF time, the light, which has passed through the liquid crystal layer LQ, is absorbed by the second polarizer PL2 (black display).

On the other hand, in a state in which a voltage is applied to the liquid crystal layer LQ, that is, in a state (ON time) in which an electric field is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by continuous lines in the Figure.

In the example shown in FIG. 4, the liquid crystal molecule LM in a region between the pixel electrode PE and primary common electrode CAL rotates clockwise relative to the column direction Y, and is aligned in a lower left direction in the Figure. The liquid crystal molecule LM in a region between the pixel electrode PE and primary common electrode CAR rotates counterclockwise relative to the column direction Y, and is aligned in a lower right direction in the Figure.

As has been described above, in the state in which the electric field is produced between the pixel electrode PE and common electrode CE in each pixel PX, the liquid crystal molecules LM are aligned in a plurality of directions, with boundaries at positions facing the pixel electrode PE, and domains are formed in the respective alignment directions. Specifically, a plurality of domains are formed in one pixel PX.

At such ON time, part of backlight, which has entered the liquid crystal display panel LPN from the backlight unit 4, passes through the first polarizer PL1, and enters the liquid crystal display panel LPN. The polarization state of the backlight, which enters the liquid crystal layer LQ, varies. At this ON time, at least part of the light emerging from the liquid crystal layer LQ passes through the second polarizer PL2 (white display).

Figure 6:
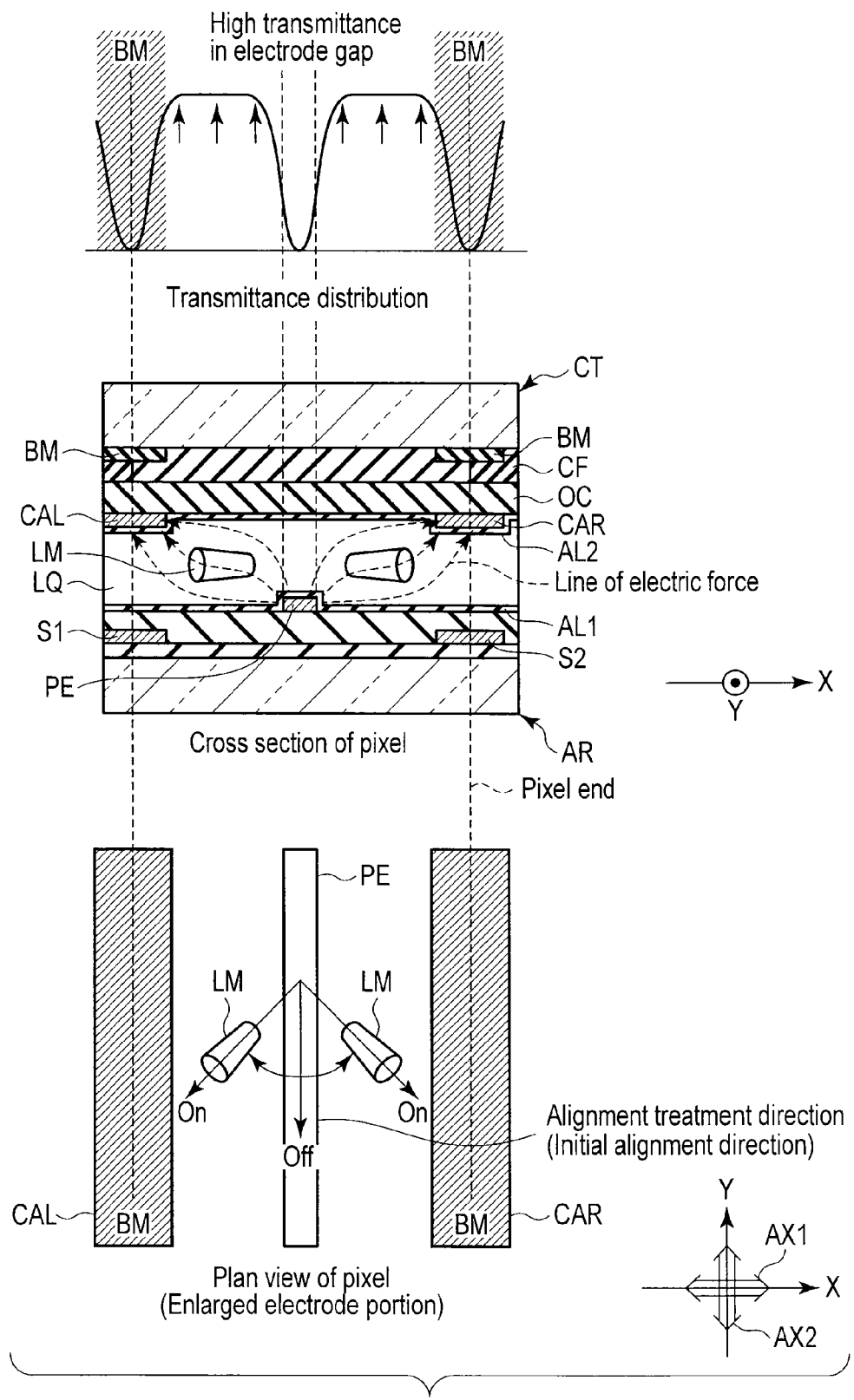
FIG. 6 is a view for explaining an electric field which is produced between a pixel electrode and a common electrode in the liquid crystal display panel shown in FIG. 4, and a relationship between directors of liquid crystal molecules and a transmittance by the electric field.

FIG. 6 is a view for explaining an electric field which is produced between the pixel electrode PE and common electrode CE in the liquid crystal display panel LPN shown in FIG. 4, and a relationship between directors of liquid crystal molecules LM and a transmittance by this electric field.

As shown in FIG. 6, in the OFF state, the liquid crystal molecules LM are initially aligned in a direction which is substantially parallel to the column direction Y. In the ON state in which a potential difference is produced between the pixel electrode PE and the common electrode CE, when the director of the liquid crystal molecule LM (or the major-axis direction of the liquid crystal molecule LM) deviates by about 45° from the first polarization axis AX1 of the first polarizer PL1 and from the second polarization axis AX2 of the second polarizer PL2 in the X-Y plane, the optical modulation ratio of the liquid crystal is highest (i.e. the transmittance at the aperture portion is highest).

In the example illustrated, in the ON state, the director of the liquid crystal molecule LM between the primary common electrode CAL and the pixel electrode PE is substantially parallel to a 45°-225° azimuth direction in the X-Y plane, and the director of the liquid crystal molecule LM between the primary common electrode CAR and the pixel electrode PE is substantially parallel to a 135°-315° azimuth direction in the X-Y plane, and a peak transmittance is obtained. At this time, if attention is paid to the transmittance distribution per pixel, the transmittance is substantially zero above the pixel electrode PE and common electrode CE. On the other hand, a high transmittance can be obtained over almost the entire area of the inter-electrode gaps between the pixel electrode PE and the common electrode CE.

Each of the primary common electrode CAL that is located immediately above the signal line S1 and the primary common electrode CAR that is located immediately above the signal line S2 is opposed to the black matrix BM. Each of the primary common electrode CAL and primary common electrode CAR has a width which is equal to or less than the width of the black matrix BM in the row direction X, and does not extend toward the pixel electrode PE from the position opposing the black matrix BM. Thus, the aperture portion in each pixel, which contributes to display, corresponds to regions between the pixel electrode PE and primary common electrode CAL and between the pixel electrode PE and primary common electrode CAR, these regions being included in the region between the black matrixes BM or the region between the signal line S1 and signal line S2.

Next, the OLB pad group pGr, switching circuit 13, signal line driver 90 and scanning line driver 31 are described. These are disposed on the outside of the display region R1. When the OLB pad group pGr, switching circuit 13 and scanning line driver 31 are formed, these can be formed at the same time by using the same material, for example, at a time of forming the pixels PX, etc.

As shown in FIG. 2, the OLB pad group pGr is formed of a plurality of pads which are arranged in a string fashion along a peripheral edge of the array substrate AR (first insulative substrate 10). The common electrode CE is indirectly connected to the pads, and a common voltage, which is a constant voltage, is applied to the common electrode CE via the pads.

Figure 7:
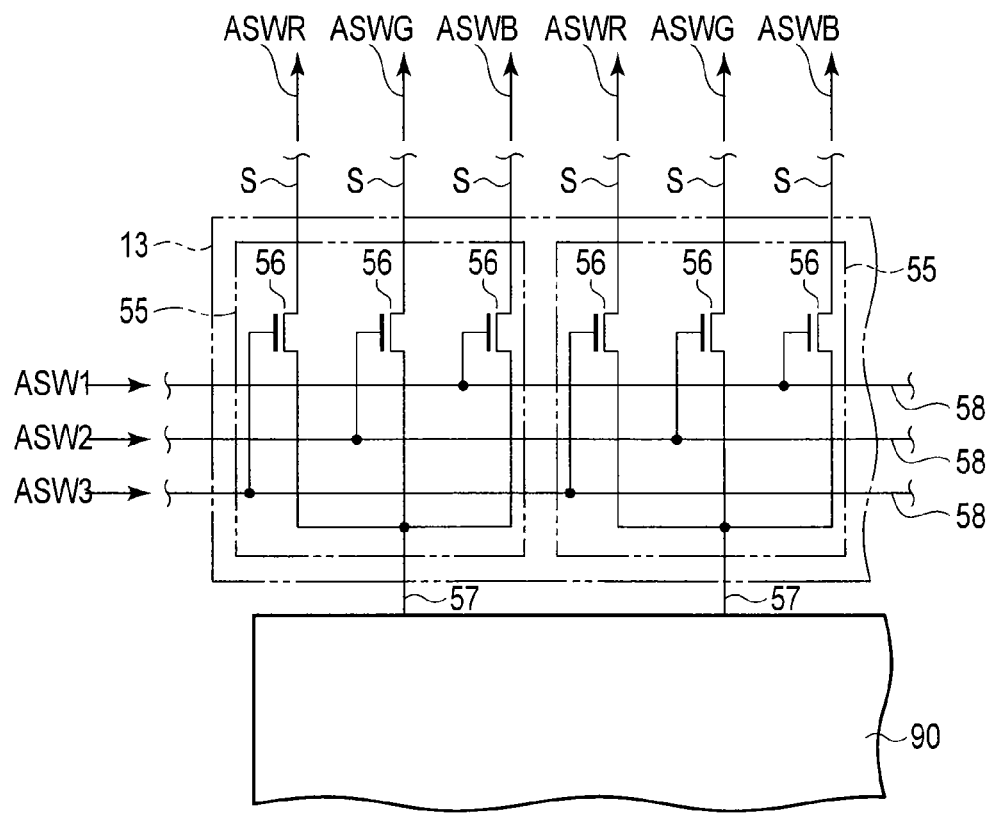
FIG. 7 is a circuit diagram showing a switching circuit, FIG. 7 being an enlarged plan view illustrating an outside of the display region of the array substrate.

FIG. 7 is a circuit diagram showing the switching circuit 13, FIG. 7 being an enlarged plan view illustrating the outside of the display region R1 of the array substrate AR.

As shown in FIG. 1, FIG. 2 and FIG. 7, the switching circuit 13 includes a plurality of switching element groups 55, and each switching element group 55 includes a plurality of switching elements 56. In this embodiment, each switching element group 55 includes three switching elements 56. The switching circuit 13 is a ⅓ multiplexer circuit. In this embodiment, the switching element 56 is formed of, for example, an n-channel TFT.

The switching circuit 13 is connected to a plurality of signal lines S. In addition, the switching circuit 13 is connected to the signal line driver 90 via connection lines 57. In this example, the number of connection lines 57 is ⅓ of the number of signal lines S.

The switching elements 56 are ON/OFF switched by control signals ASW1, ASW2 and ASW3, so that three signal lines S may be driven in a time division manner in association with one output (connection line 57) of the signal line driver 90. The control signals ASW1, ASW2 and ASW3 are delivered from the controller 100 to the switching elements 56 via a plurality of pads (not shown) and a plurality of control lines 58 which are connected to these pads. In 1 horizontal scanning period (1H), the controller 100 delivers ON-state (high-level) control signals ASW1, ASW2 and ASW3 to the switching elements 56, and writes desired video signals to the pixels PX which are arranged in the row direction X.

The switching circuit 13, which is illustrated, is merely an example. The switching circuit 13 may be variously altered. The number of selection of signal lines S is not limited to 3.

The signal line driver 90 is composed of an IC (integrated circuit), and is mounted (COG mounting) on the first insulative substrate 10. As is understood from the above, the signal line driver 90 is indirectly connected to plural signal lines S. The signal line driver 90 is also connected to plural pads. The signal line driver 90 sends video signals, which are delivered via the plural pads, to the switching circuit 13.

Figure 8:
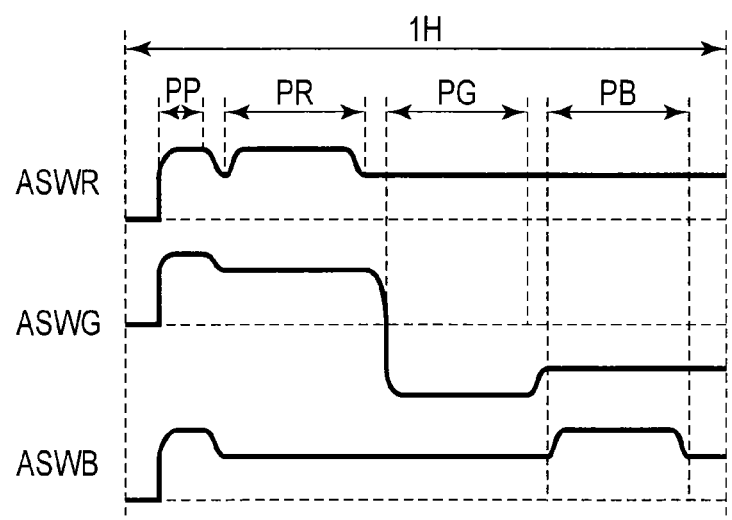
FIG. 8 is a timing chart relating to the liquid crystal display device according to the embodiment, and showing signals ASWR, ASWG and ASWB in 1 horizontal scanning period.
Figure 10:
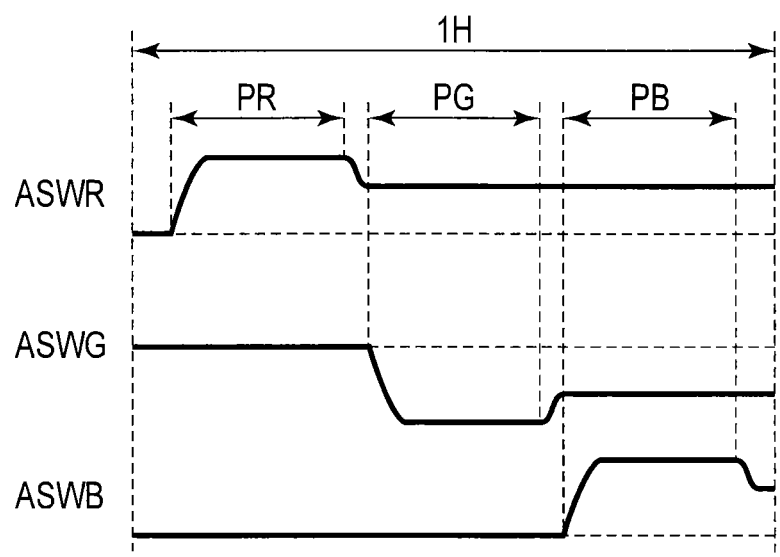
FIG. 10 is a timing chart relating to a liquid crystal display device of a comparative example, and showing signals ASWR, ASWG and ASWB in 1 horizontal scanning period.

FIG. 8 is a timing chart relating to the liquid crystal display device according to the embodiment, and showing signals ASWR, ASWG and ASWB in 1 horizontal scanning period (1H). FIG. 10 is a timing chart relating to a liquid crystal display device of a comparative example, and showing signals ASWR, ASWG and ASWB in 1 horizontal scanning period.

As illustrated in FIG. 10, in the liquid crystal display device of the comparative example, write periods PR, PG and PB are provided in 1 horizontal scanning period. The write period PR is a period in which a video signal is delivered to the signal line S to which the pixel PX for red display is connected. The write period PG is a period in which a video signal is delivered to the signal line S to which the pixel PX for green display is connected. The write period PB is a period in which a video signal is delivered to the signal line S to which the pixel PX for blue display is connected.

The signal ASWR functions as a video signal which is delivered to the pixel PX for red display during the write period PR. The signal ASWG functions as a video signal which is delivered to the pixel PX for green display during the write period PG. The signal ASWB functions as a video signal which is delivered to the pixel PX for blue display during the write period PB.

As shown in FIG. 8, in the liquid crystal display device according to the embodiment, in 1 horizontal scanning period, write periods PR, PG and PB are provided, and a precharge period PP is provided before the write periods. Compared to the comparative example, the write periods PR, PG and PB are shortened, thereby securing the precharge period PP.

The signal ASWR functions as a precharge signal during the precharge period PP and functions as a video signal which is delivered to the pixel PX for red display during the write period PR. The signal ASWG functions as a precharge signal during the precharge period PP and functions as a video signal which is delivered to the pixel PX for green display during the write period PG. The signal ASWB functions as a precharge signal during the precharge period PP and functions as a video signal which is delivered to the pixel PX for blue display during the write period PB.

Figure 9:
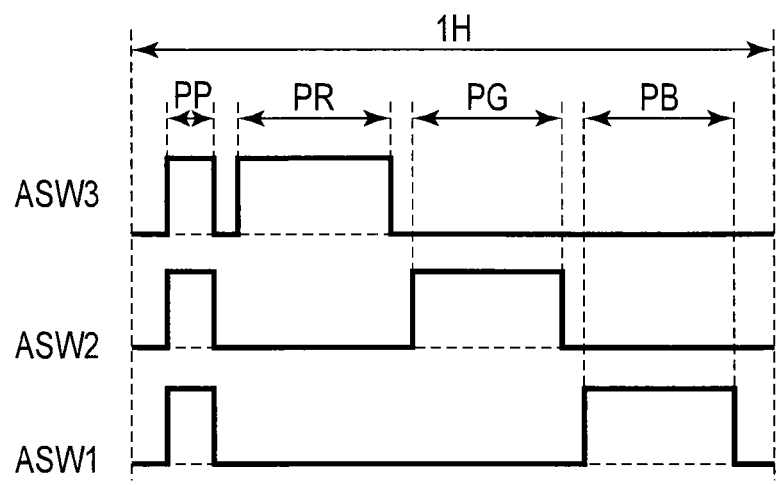
FIG. 9 is a timing chart relating to the liquid crystal display device according to the embodiment, and showing control signals ASW1, ASW2 and ASW3 in 1 horizontal scanning period.

As shown in FIG. 7, FIG. 8 and FIG. 9, high-level control signals ASW1 to ASW3 are simultaneously delivered to the control lines 58 during the precharge period PP, thereby turning on the switching elements 56 at the same time. Thereby, the signal line driver 90 delivers signals ASWR, ASWG and ASWB (precharge signals) to all the signal lines S. Immediately after the precharge period PP, the control signals ASW1 to ASW3 are switched to a low level.

Next, in the write period PR, the control signal ASW3 is switched to a high level, while the control signals ASW1 and ASW2 are kept at the low level. Thereby, the signal line driver 90 delivers signals ASWR (video signals) to plural signal lines S connected to plural switching elements 56 which have been switched on by the control signal ASW3. Incidentally, immediately after the write period PR, the control signal ASW3 is switched to the low level.

Subsequently, in the write period PG, the control signal ASW2 is switched to the high level, while the control signals ASW1 and ASW3 are kept at the low level. Thereby, the signal line driver 90 delivers signals ASWG (video signals) to plural signal lines S connected to plural switching elements 56 which have been switched on by the control signal ASW2. Incidentally, immediately after the write period PG, the control signal ASW2 is switched to the low level.

Thereafter, in the write period PB, the control signal ASW1 is switched to the high level, while the control signals ASW2 and ASW3 are kept at the low level. Thereby, the signal line driver 90 delivers signals ASWB (video signals) to plural signal lines S connected to plural switching elements 56 which have been switched on by the control signal ASW1. Incidentally, immediately after the write period PB, the control signal ASW1 is switched to the low level.

As has been described above, the signal line driver 90 delivers the precharge signals to the signal lines S in the precharge period PP before delivering the video signals to the signal lines S. The signal line driver 90 provides the precharge period PP in every 1 horizontal scanning period.

In the present embodiment, the liquid crystal display device adopts a normally black mode. By being supplied with a common voltage Vcom, the common electrode CE is set at a constant potential. For example, the common electrode CE can be set at a ground potential or a potential close to a ground potential. The voltage value of the video signal is set at a voltage of a positive polarity or a voltage of a negative polarity with reference to the common voltage Vcom. In this embodiment, the voltage value of a video signal of a positive polarity is 0.2 to 4.6 V, and the voltage value of a video signal of a negative polarity is −0.2 to −4.6 V.

Figure 11:
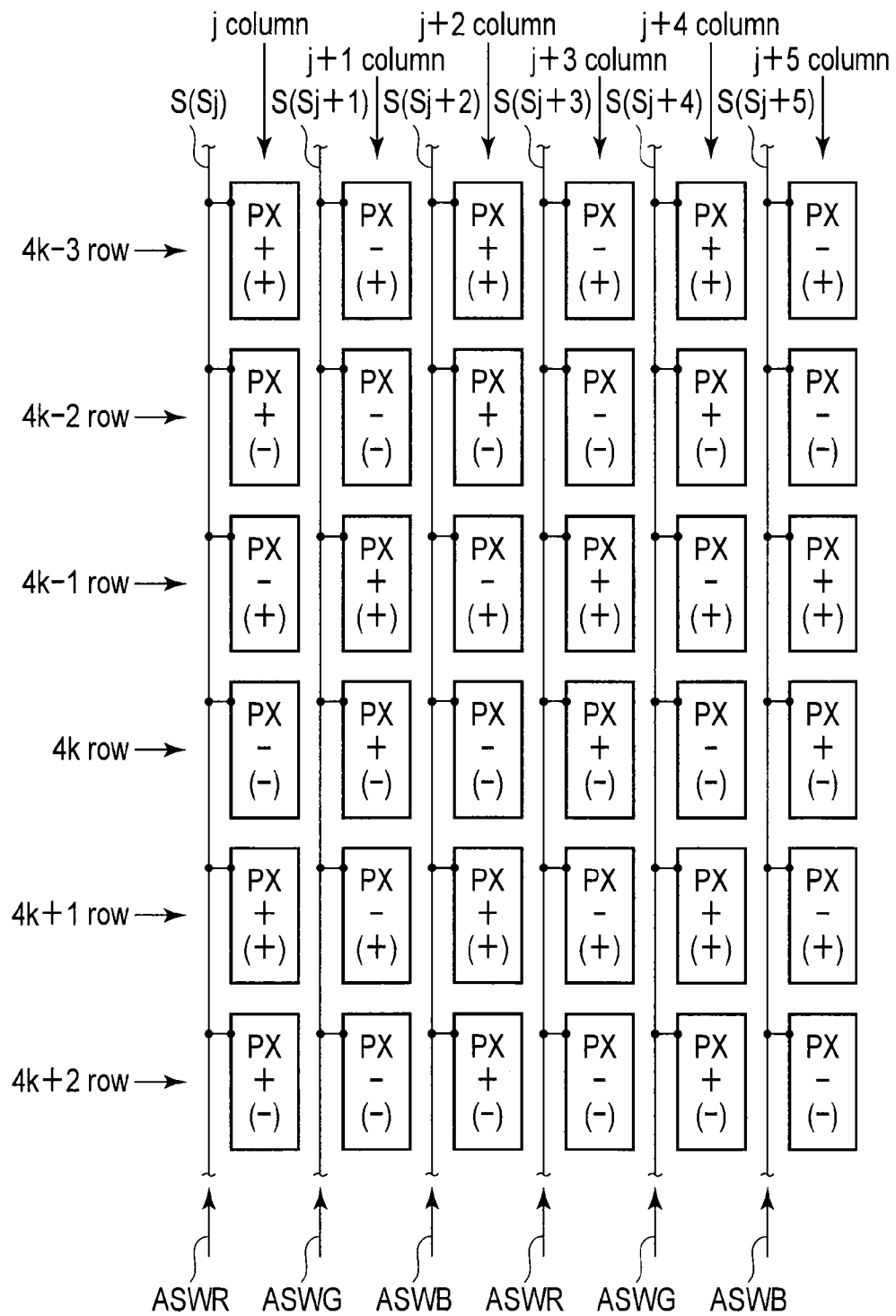
FIG. 11 is a schematic view for explaining 2H1V reverse driving which is adopted by the liquid crystal display device according to the embodiment.

FIG. 11 is a schematic view for explaining 2H1V reverse driving which is adopted by the liquid crystal display device according to the embodiment. As shown in FIG. 11, the signal line driver 90 executes HV (horizontal and vertical) reverse driving. In this embodiment, the signal line driver 90 executes 2H1V reverse driving. Incidentally, the signal line driver 90 may execute 3H1V reverse driving or 4H1V reverse driving. In the 2H1V reverse driving, the polarities of plural pixel electrodes PE are reversed in units of one column in the row direction X and are versed in units of two rows in the column direction Y. By adopting the HV (horizontal and vertical) reverse driving, the positive and negative polarities are mixedly present at the time of write of each row and, for example, coupling from the signal line S to the common electrode CE is canceled by the positive and negative polarities. Thus, there is an advantage that lateral crosstalk is improved. In FIG. 11, the polarities of plural pixel electrodes PE in an arbitrary 1 frame are indicated by "+" or "−". The polarities of plural pixel electrodes PE between two successive frame periods are reversed.

Next, the precharge signal is explained.

It should suffice if the precharge signal has a voltage level which is different from an intermediate (center) voltage value between a video signal of a positive polarity and a video signal of a negative polarity. Preferably, the voltage level that is possessed by the precharge signal is in a range of between a highest voltage value (4.6 V, white voltage) of the video signal of the positive polarity and a deepest voltage value (−4.6 V, white voltage) of the video signal of the negative polarity. Incidentally, it should suffice if the voltage level that is possessed by the precharge signal is either the highest voltage value (4.6 V) of the video signal of the positive polarity or the deepest voltage value (−4.6 V) of the video signal of the negative polarity.

In this embodiment, the voltage value of the precharge signal is 4.6 V and −4.6 V. In FIG. 11, the polarity of the precharge signal is indicated by (+) and (−). As described above, since the liquid crystal display device adopts the normally black mode, the voltage level possessed by the precharge signal is a voltage value of a video signal for white display. In addition, in this embodiment, the polarity of the precharge signal is determined so that a balance is kept in units of four rows.

In this case, that the voltage value of the video signal of the positive polarity is highest means that |(voltage value of video signal of positive polarity)−(common voltage Vcom)| is highest. Thus, it can be said that the decrease of |(voltage value of video signal of positive polarity)−(common voltage Vcom)| is the decrease of the voltage value of the video signal of the positive polarity.

In addition, that the voltage value of the video signal of the negative polarity is deepest means that |(common voltage Vcom)−(voltage value of video signal of negative polarity)| is greatest. Thus, it can be said that the decrease of |(common voltage Vcom)−(voltage value of video signal of negative polarity)| is the shallowing of the voltage value of the video signal of the negative polarity.

Thus, in FIG. 11, it is assumed that, of a plurality of pixels PX (pixel electrodes PE), a pixel PX of a 4k−3 row of a j column is a first pixel, a pixel PX of a 4k−2 row of the j column is a second pixel, a pixel PX of a 4k−1 row of the j column is a third pixel, and a pixel PX of a 4k row of the j column is a fourth pixel. It should be noted that j and k are natural numbers.

Next, as an example of driving of first to fourth pixels, the operation of the signal line driver 90 in a certain 1 frame period is described. The signal line driver 90, together with the switching circuit 13, drives the pixels.

The signal line driver 90 delivers a positive-polarity precharge signal to a signal line Sj(S) of the j column, during 1 horizontal scanning period of the 4k−3 row. Then, the signal line driver 90 delivers a positive-polarity video signal to the signal line Sj, and to the first pixel.

The signal line driver 90 delivers a negative-polarity precharge signal to the signal line Sj of the j column, during 1 horizontal scanning period of the 4k−2 row. Then, the signal line driver 90 delivers a positive-polarity video signal to the signal line Sj, and to the second pixel.

The signal line driver 90 delivers a positive-polarity precharge signal to the signal line Sj of the j column, during 1 horizontal scanning period of the 4k−1 row. Then, the signal line driver 90 delivers a negative-polarity video signal to the signal line Sj, and to the third pixel.

The signal line driver 90 delivers a negative-polarity precharge signal to the signal line Sj of the j column, during 1 horizontal scanning period of the 4k row. Then, the signal line driver 90 delivers a negative-polarity video signal to the signal line Sj, and to the fourth pixel.

In FIG. 11, it is assumed that, of the plural pixels PX (pixel electrodes PE), a pixel PX of a 4k−3 row of a j+1 column is a fifth pixel, and a pixel PX of a 4k−3 row of a j+2 column is a sixth pixel.

Next, as an example of driving of the first, fifth and sixth pixels, the operation of the signal line driver 90 in 1 horizontal scanning period of the 4k−3 row is described. The signal line driver 90, together with the switching circuit 13, drives the first, fifth and sixth pixels PX in the following manner.

In the 1 horizontal scanning period of the 4k−3 row, before delivering the first to third video signals to the first to third signal lines Sj, Sj+1 and Sj+2, high-level control signals ASW1 to ASW3 are simultaneously delivered to the control lines 58, and the switching elements 56 are simultaneously switched on. Thereby, the signal line driver 90 delivers signals ASWR, ASWG and ASWB (precharge signals) to the first to third signal lines Sj, Sj+1 and Sj+2. Specifically, the signal line driver 90 simultaneously delivers precharge signals of the same polarity to the first to third signal lines Sj, Sj+1 and Sj+2.

After the precharge signals have been delivered, in the write period PR, the control signal ASW3 is switched to the high level, although the control signals ASW1 and ASW2 are at the low level. Thereby, the signal line driver 90 delivers the signal ASWR (first video signal) to the signal line Sj which is connected to the switching element 56 which has been switched on by the control signal ASW3.

After the first video signal has been delivered to the first signal line Sj, in the write period PG, the control signal ASW2 is switched to the high level, although the control signals ASW1 and ASW3 are at the low level. Thereby, the signal line driver 90 delivers the signal ASWG (second video signal) to the signal line Sj+1 which is connected to the switching element 56 which has been switched on by the control signal ASW2.

After the second video signal has been delivered to the second signal line Sj+1, in the write period PB, the control signal ASW1 is switched to the high level, although the control signals ASW2 and ASW3 are at the low level. Thereby, the signal line driver 90 delivers the signal ASWB (third video signal) to the signal line Sj+2 which is connected to the switching element 56 which has been switched on by the control signal ASW1.

Next, a description is given of the vertical crosstalk ratios of the liquid crystal display device according to the embodiment, a liquid crystal display device of a comparative example, and a liquid crystal display device of another comparative example. FIG. 12 is a graph showing the vertical crosstalk ratios (%) of the liquid crystal display device according to the embodiment, the liquid crystal display device of the comparative example, and the liquid crystal display device of the another comparative example. When the vertical crosstalk ratios were calculated, it was assumed that the luminance at an intermediate gradation was about 2.7% of the luminance for white display. The method of calculating crosstalk ratios will be described later.

In the liquid crystal display device according to the embodiment, the precharge period PP is provided in the 1 horizontal scanning period, and the precharge signals are delivered to the signal lines S. The voltage level that is possessed by the precharge signal is the highest voltage value (4.6 V) of the positive-polarity video signal and the deepest voltage value (−4.6 V) of the negative-polarity video signal. In the liquid crystal display device of the comparative example, a precharge period is provided in 1 horizontal scanning period, and precharge signals are delivered to signal lines S. The voltage level that is possessed by the precharge signal is an intermediate voltage value of a video signal, and is 0 V (GND). In the liquid crystal display device of the another comparative example, no precharge period is provided, and this display device does not adopt such a configuration that precharge signals are applied to signal lines S.

As shown in FIG. 12, the vertical crosstalk ratio of the liquid crystal display device according to the embodiment was 0.3%. The vertical crosstalk ratio of the liquid crystal display device of the comparative example was 1.6%. The vertical crosstalk ratio of the liquid crystal display device of the another comparative example was 1.5%.

From the above, it is understood that the occurrence of vertical crosstalk can be reduced by providing the precharge period PP in the 1 horizontal scanning period, and by delivering to the signal lines S the precharge signal whose voltage level is the highest voltage value (4.6 V) of the positive-polarity video signal and the deepest voltage value (−4.6V) of the negative-polarity video signal.

Next, a description is given of crosstalk ratios relative to BL luminance in the liquid crystal display device according to the embodiment, the liquid crystal display device of the comparative example, and the liquid crystal display device of the another comparative example. The BL luminance is indicative of the luminance level of backlight which is emitted from the backlight unit 4 to the liquid crystal display panel LPN.

FIG. 13 is a graph showing a variation of a vertical crosstalk ratio relative to BL luminance in the liquid crystal display device of the embodiment. FIG. 14 is a graph showing a variation of a vertical crosstalk ratio relative to BL luminance in the liquid crystal display device of the comparative example. FIG. 15 is a graph showing a variation of a vertical crosstalk ratio relative to BL luminance in the liquid crystal display device of the another comparative example.

As shown in FIG. 13, it is understood that the vertical crosstalk ratio of the liquid crystal display device of the embodiment is 0.5% or less, regardless of the BL luminance, and is a good value. The reason for this is that the adverse effect by leak current, which occurs in the switching element SW (semiconductor layer), can be reduced by delivering the above-described precharge signals to the signal lines S.

In the meantime, the liquid crystal display device according to the embodiment, the liquid crystal display device of the comparative example and the liquid crystal display device of the another comparative example are not configured such that a light shield layer is provided between the semiconductor layer (switching element SW) and the backlight unit 4. Thus, by the radiation of backlight on the semiconductor layer, leak current occurs in the semiconductor layer.

As shown in FIG. 14, it is understood that the vertical crosstalk ratio of the liquid crystal display device of the comparative example increases as the BL luminance becomes higher. The reason for this is that the leak current occurring in the semiconductor layer of the switching element SW increases as the BL luminance becomes higher. As shown in FIG. 15, it is understood that the vertical crosstalk ratio of the liquid crystal display device of the another comparative example increases as the BL luminance becomes higher, like the result shown in FIG. 14.

Next, a description is given of the crosstalk ratios relative to BL luminance in the liquid crystal display device according to the embodiment, the liquid crystal display device of the comparative example, and the liquid crystal display device of the another comparative example. In addition, a description is given of the method and result of verification of the crosstalk ratios. In the meantime, the positive-polarity frames, negative-polarity frames, and the voltages applied to the liquid crystal are averaged.

FIG. 16 is a view for explaining the definition of the crosstalk ratio, and illustrates a vertical crosstalk measurement screen. FIG. 17 is another view for explaining the definition of the crosstalk ratio, and illustrates a reference screen.

As shown in FIG. 16, on the vertical crosstalk measurement screen, the voltage level of the pixel electrode PE at a measurement location A shown in FIG. 16 is measured. At the time of measurement, scanning is performed in the direction of an arrow. As shown in FIG. 17, on the reference screen, the voltage level of the pixel electrode PE at a measurement location A shown in FIG. 17 (the same location as in FIG. 16) is measured. At the time of measurement, scanning is performed in the direction of an arrow.

FIG. 18 is a graph showing a variation of the voltage level of the pixel electrode PE at the measurement location A on the vertical crosstalk measurement screen of the liquid crystal display device of the another comparative example. FIG. 19 is a graph showing a variation of the voltage level of the pixel electrode PE at the measurement location A on the reference screen of the liquid crystal display device of the another comparative example. The voltage level of the pixel electrode PE is indicative of |(voltage value of pixel electrode PE)−(common voltage Vcom)|.

As shown in FIG. 18, in the intermediate gradation write period (intermediate gradation display period), the voltage loss increases since a pixel leak occurs at a constant inclination. Specifically, by the adverse effect of leak current occurring in the switching element SW, the ratio of a decrease of the voltage level of the pixel electrode PE increases. Incidentally, in the positive-polarity pixel PX, the ratio of a decrease of the voltage level of the pixel electrode PE increases. In the negative-polarity pixel PX, the ratio of shallowing of the voltage level of the pixel electrode PE increases. In other words, |(voltage value of pixel electrode PE)−(common electrode Vcom)| decreases.

In the white write period (white display period), since the inclination becomes gentler, the voltage loss decreases. Specifically, even if there is an adverse effect of leak current occurring in the switching element SW, the ratio of a decrease of the voltage level of the pixel electrode PE decreases.

It is now assumed that an area indicated by hatching in FIG. 18 is Sc1. A period Pa is a period corresponding to 1 vertical scanning period (1 frame period).

As shown in FIG. 19, only write of a video signal for intermediate gradation display is executed at the pixel PX of the measurement location A on the reference screen. Thus, in the intermediate gradation write period (period Pa), since pixel leak occurs at a constant inclination, the voltage loss increases. Specifically, the ratio of a decrease of the voltage level of the pixel electrode PE increases.

It is now assumed that an area indicated by hatching in FIG. 19 is Sc2.

In the above case, the crosstalk ratio can be defined by the following equation:

$$\text{crosstalk ratio} = (Sc1 - Sc2)/Sc2 \times 100.$$

In the liquid crystal display device of the another comparative example, since Sc1>Sc2, it is understood that the crosstalk ratio increases. Specifically, in the liquid crystal display device of the another comparative example, since the luminance level of the vertical crosstalk measurement screen becomes higher than the luminance level of the reference screen, the crosstalk becomes obvious (visible).

FIG. 20 is a graph showing a variation of the voltage level of the pixel electrode PE at the measurement location A on the vertical crosstalk measurement screen of the liquid crystal display device according to the present embodiment. FIG. 21 is a graph showing a variation of the voltage level of the pixel electrode PE at the measurement location A on the reference screen of the liquid crystal display device according to the present embodiment.

As shown in FIG. 20, in the intermediate gradation write period (intermediate gradation display period), the effect (precharge effect) by delivering the precharge signals to the signal lines S can be obtained. Since the inclination of the voltage level of the pixel electrode PE becomes gentler, the voltage loss decreases. Specifically, even if there is an adverse effect of leak current occurring in the switching element SW, the ratio of a decrease of the voltage level of the pixel electrode PE decreases.

It is now assumed that an area indicated by hatching in FIG. 20 is Se1.

As shown in FIG. 21, only write of a video signal for intermediate gradation display is executed at the pixel PX of the measurement location A on the reference screen. In this case, too, since the precharge effect can be obtained, the inclination of the voltage level of the pixel electrode PE becomes gentler, and the voltage loss decreases. Specifically, even if there is an adverse effect of leak current occurring in the switching element SW, the ratio of a decrease of the voltage level of the pixel electrode PE decreases.

It is now assumed that an area indicated by hatching in FIG. 21 is Se2.

In the above case, the crosstalk ratio can be defined by the following equation:

$$\text{crosstalk ratio} = (Se1 - Se2)/Se2 \times 100.$$

In the liquid crystal display device according to the present embodiment, since Se1≈Se2, it is understood that the crosstalk ratio becomes substantially 0.0%. Specifically, in the liquid crystal display device according to the embodiment, since the voltage level that is possessed by the precharge signal is the highest voltage value (4.6 V) of the positive-polarity video signal and the deepest voltage value (−4.6 V) of the negative-polarity video signal, the difference in luminance between the two screens, i.e. the vertical stroke measurement screen and the reference screen, decreases, and the crosstalk becomes invisible.

According to the liquid crystal display device of the embodiment with the above-described structure, the liquid crystal display device comprises the array substrate AR, counter-substrate CT, liquid crystal layer LQ and signal line driver 90. The array substrate AR includes the signal lines S, pixel electrodes PE and switching elements SW. The switching element SW is a TFT including a semiconductor layer which includes a source region electrically connected to the signal line S and a drain region electrically connected to the pixel electrode PE.

The counter-substrate CT includes the common electrode CE which is set at a constant potential, and is arranged opposite to the array substrate AR with a gap. The liquid crystal layer LQ is held between the array substrate AR and the counter-substrate CT, and an electric field, which is produced between the pixel electrode PE and common electrode CE, acts on the liquid crystal layer LQ. The signal line driver 90 is electrically connected to the signal lines S, delivers video signals of positive and negative polarities to the signal lines S, and executes 2H1V reverse driving.

The signal line driver 90 delivers, in every 1 horizontal scanning period (1H), the precharge signals to the signal lines S before delivering the video signals to the signal lines S. The precharge signal has a voltage level which is different from an intermediate voltage value between a positive-polarity video signal and a negative-polarity video signal. In this embodiment, the voltage level that is possessed by the precharge signal is the highest voltage value (4.6 V) of the positive-polarity video signal and the deepest voltage value (−4.6 V) of the negative-polarity video signal.

By delivering the precharge signals to the signal lines S, as described above, the occurrence of vertical crosstalk can be reduced even in the liquid crystal display device which is configured such that backlight is radiated on the semiconductor layer (switching element SW). Specifically, since there is no need to provide a light shield layer between the semiconductor layer (switching element SW) and the backlight unit 4 in order to reduce the leak current occurring in the semiconductor layer, an increase in manufacturing cost can be suppressed.

In addition, the occurrence of vertical crosstalk can be reduced, without a need to increase the storage capacitance CS of the pixel PX, for example, by increasing the width of the storage capacitance line C1. Thus, a decrease in aperture ratio can be suppressed.

According to the present embodiment, a high transmittance can be obtained in the inter-electrode gap between the pixel electrode PE and the common electrode CE. Thus, a transmittance per pixel can sufficiently be increased by increasing the inter-electrode distances between the pixel electrode PE and the primary common electrode CAL and between the pixel electrode PE and primary common electrode CAR. As regards product specifications in which the pixel pitch is different, the peak condition of the transmittance distribution, as shown in FIG. 6, can be used by varying the inter-electrode distance (i.e. by varying the position of disposition of the primary common electrode CA relative to the pixel electrode PE disposed at a substantially central part of the pixel PX). Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, as shown in FIG. 6, if attention is paid to the transmission distribution in the region opposing the black matrix BM, the transmittance is sufficiently lowered. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region opposing the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distances between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the primary common electrodes CA are opposed to the signal lines S. In particular, when the primary common electrode CAL and primary common electrode CAR are disposed immediately above the signal line S1 and signal line S2, respectively, the aperture portion AP can be increased and the transmittance of the pixel PX can be improved, compared to the case in which the primary common electrode CAL and primary common electrode CAR are disposed on the pixel electrode PE side of the signal line S1 and signal line S2.

Furthermore, by disposing the primary common electrode CAL and primary common electrode CAR immediately above the signal line S1 and signal line S2, respectively, the inter-electrode distances between the pixel electrode PE and the primary common electrode CAL and between the pixel electrode PE and primary common electrode CAR, can be increased, and a lateral electric field, which is closer to a horizontal lateral electric field, can be produced. Therefore, a wide viewing angle, which is the advantage of an IPS mode, etc. in the conventional structure, can be maintained. Moreover, the above-described liquid crystal display device has a high responsivity and has, in particular, good alignment stability, as described above.

According to the present embodiment, a plurality of domains can be formed in one pixel. Thus, the viewing angle can optically be compensated in plural directions, and a wide viewing angle can be realized.

Since a lateral electric field (oblique electric field) is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive electrically conductive material such as ITO, little backlight passes through these regions, and these regions hardly contribute to display at the ON time. Thus, the pixel electrode PE and common electrode CE do not necessarily need to be formed of a transparent, electrically conductive material, and may be formed of an electrically conductive material such as aluminum, silver or copper.

From the above, it is possible to obtain a liquid crystal display device which can reduce the occurrence of vertical crosstalk, without causing an increase in manufacturing cost or a decrease in aperture ratio.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the polarity of the precharge signal is not limited to the above-described embodiment, and may be variously altered.

Figure 22:
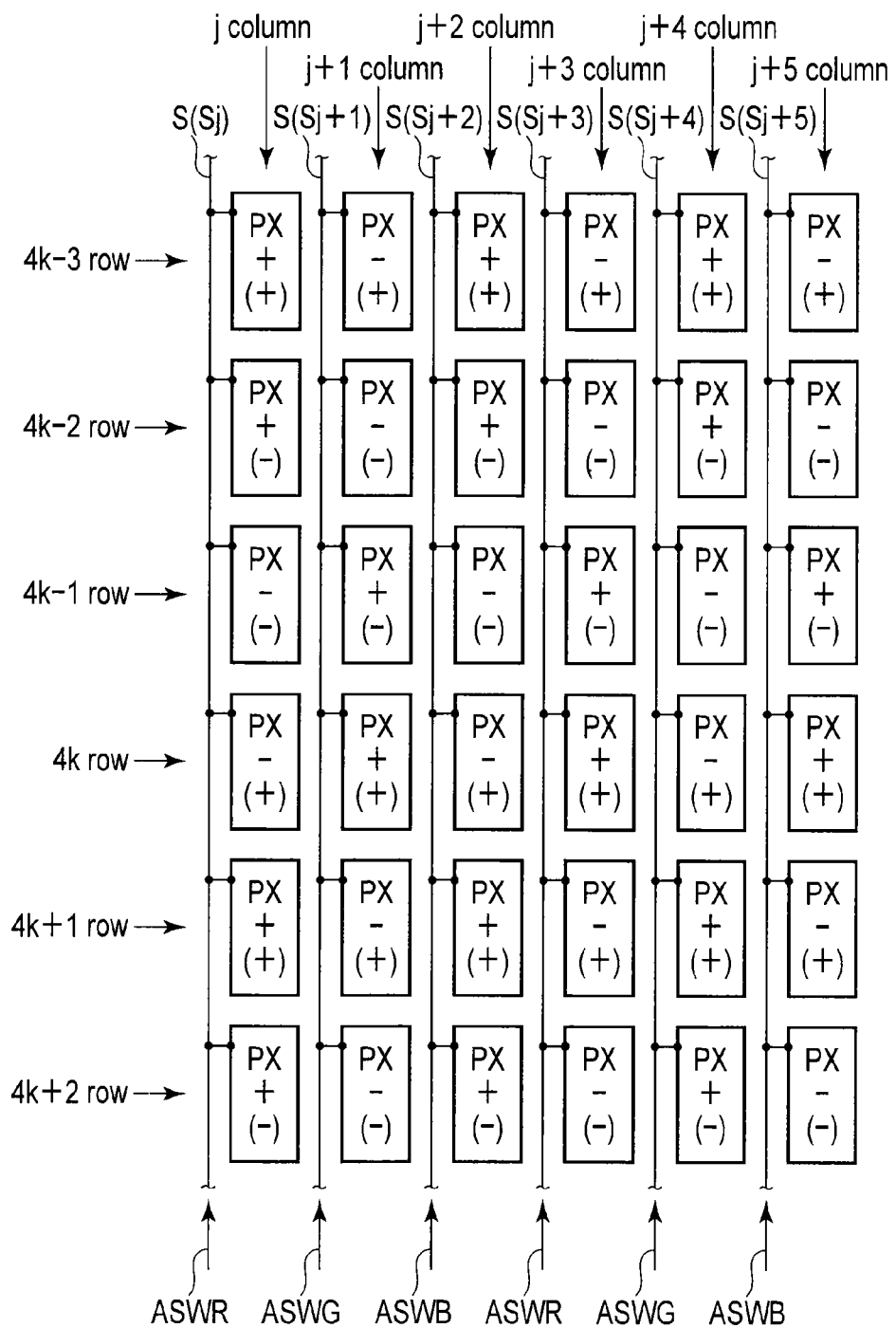
FIG. 22 is a schematic view illustrating a modification of the 2H1V reverse driving which is adopted by the liquid crystal display device of the embodiment, and illustrating a modification of the polarities of precharge signals.

FIG. 22 is a schematic view for explaining a modification of the 2H1V reverse driving which is adopted by the liquid crystal display device according to the embodiment, and illustrates a modification of the polarity of the precharge signal. As illustrated in FIG. 22, the signal line driver 90 may deliver a positive-polarity precharge signal to the signal line S during 1 horizontal scanning period of the 4k−3 row, may deliver a negative-polarity precharge signal to the signal line S during 1 horizontal scanning period of the 4k−2 row, may deliver a negative-polarity precharge signal to the signal line S during 1 horizontal scanning period of the 4k−1 row, and may deliver a positive-polarity precharge signal to the signal line S during 1 horizontal scanning period of the 4k row.

FIG. 23 is a schematic view for explaining another modification of the 2H1V reverse driving which is adopted by the liquid crystal display device according to the embodiment, and illustrates another modification of the polarity of the precharge signal. As illustrated in FIG. 23, the signal line driver 90 may deliver only a positive-polarity precharge signal to the signal line S in every 1 horizontal scanning period.

FIG. 24 is a schematic view for explaining another modification of the 2H1V reverse driving which is adopted by the liquid crystal display device according to the embodiment, and illustrates another modification of the polarity of the precharge signal. As illustrated in FIG. 24, the signal line driver 90 may deliver only a negative-polarity precharge signal to the signal line S in every 1 horizontal scanning period.

As described above, the HV (horizontal and vertical) reverse driving is not limited to the 2H1V reverse driving and may be variously altered. For example, 1H1V reverse driving may be adopted.

Figure 25:
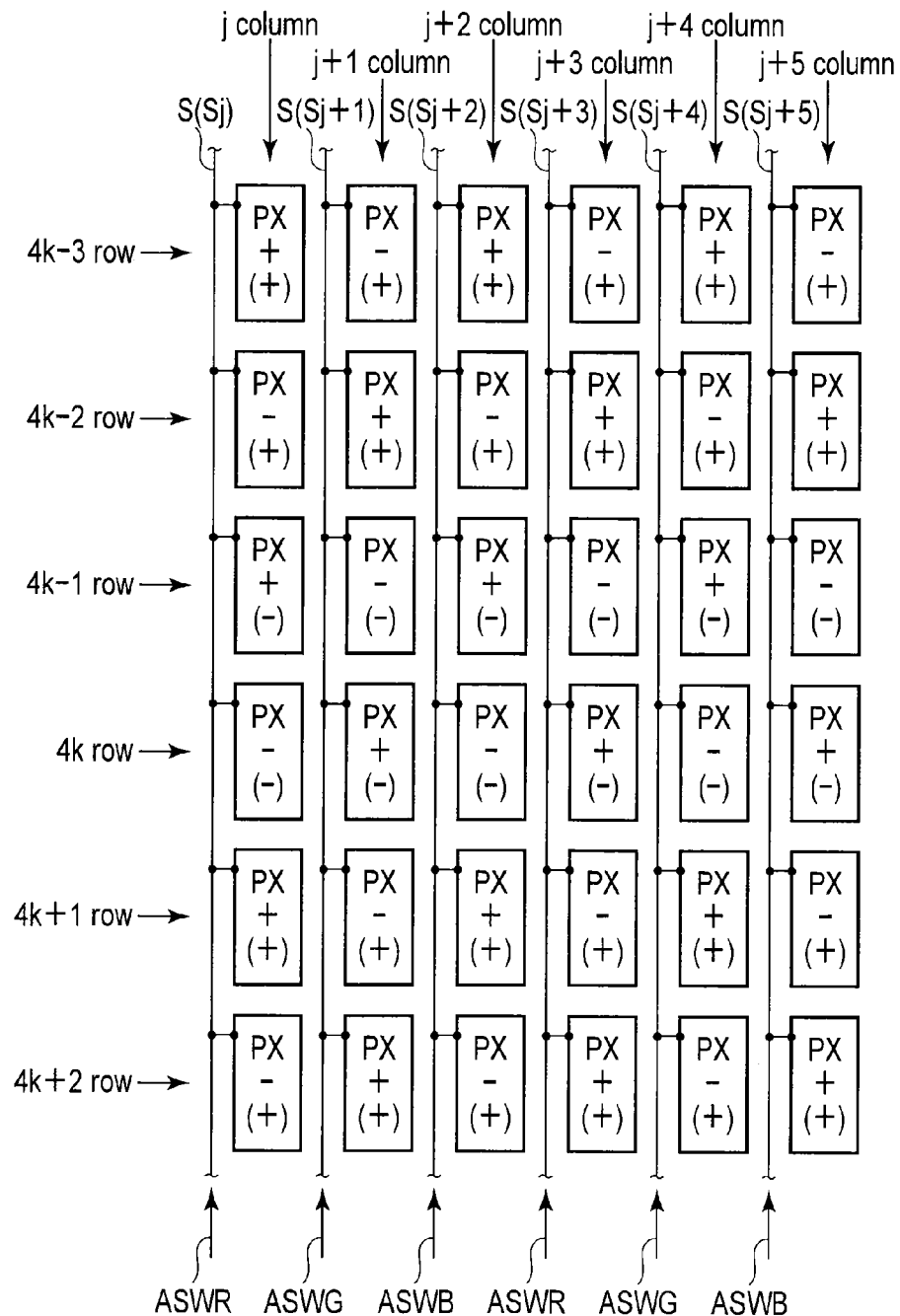
FIG. 25 is a schematic view for explaining 1H1V reverse driving which is adopted by a modification of the liquid crystal display device according to the embodiment.

FIG. 25 is a schematic view for explaining 1H1V reverse driving which is adopted by a modification of the liquid crystal display device according to the embodiment. As illustrated in FIG. 25, the signal line driver 90 executes 1H1V reverse driving. In the 1H1V reverse driving, the polarities of plural pixel electrodes PE are reversed in units of one column in the row direction X, and are versed in units of one row in the column direction Y.

The signal line driver 90 may deliver a positive-polarity precharge signal to the signal line S during 1 horizontal scanning period of the 4k−3 row, may deliver a positive-polarity precharge signal to the signal line S during 1 horizontal scanning period of the 4k−2 row, may deliver a negative-polarity precharge signal to the signal line S during 1 horizontal scanning period of the 4k−1 row, and may deliver a negative-polarity precharge signal to the signal line S during 1 horizontal scanning period of the 4k row.

Figure 26:
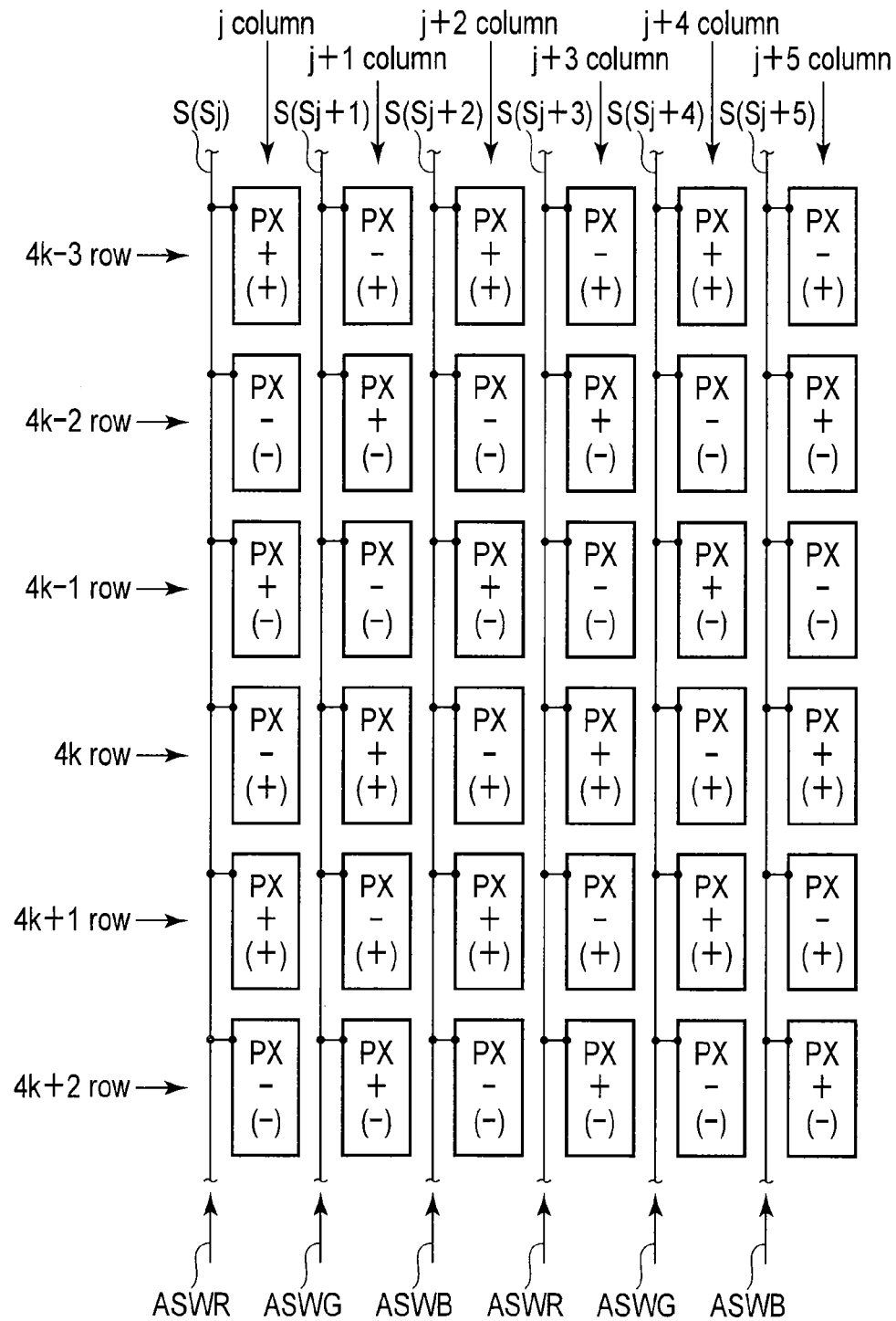
FIG. 26 is a schematic view for explaining 1H1V reverse driving which is adopted by a modification of the liquid crystal display device according to the embodiment, and illustrating a modification of the polarities of precharge signals.

FIG. 26 is a schematic view for explaining 1H1V reverse driving which is adopted by a modification of the liquid crystal display device according to the embodiment, and illustrating a modification of the polarities of precharge signals. As shown in FIG. 26, for example, the polarities of the precharge signals are not limited to the example shown in FIG. 25, and may be variously altered. For example, the signal line driver 90 may deliver a positive-polarity precharge signal to the signal line S during 1 horizontal scanning period of the 4k−3 row, may deliver a negative-polarity precharge signal to the signal line S during 1 horizontal scanning period of the 4k−2 row, may deliver a negative-polarity precharge signal to the signal line S during 1 horizontal scanning period of the 4k−1 row, and may deliver a positive-polarity precharge signal to the signal line S during 1 horizontal scanning period of the 4k row.

The above-described example is directed to the case where the initial alignment direction of liquid crystal molecules LM is parallel to the column direction Y. However, the initial alignment direction of liquid crystal molecules LM may be an oblique direction D which obliquely crosses the column direction Y, as shown in FIG. 4. An angle θ1 formed between the column direction Y and the initial alignment direction D is 0° or more and 45° or less. From the standpoint of alignment control of liquid crystal molecules LM, it is very effective that the angle θ1 is about 5° to 30°, and more preferably, 20° or less. Specifically, it is desirable that the initial alignment direction of liquid crystal molecules LM be substantially parallel to a direction in a range of 0° to 20° relative to the column direction Y.

The above-described example relates to the case in which the liquid crystal layer LQ is composed of a liquid crystal material having a positive (positive-type) dielectric anisotropy. Alternatively, the liquid crystal layer LQ may be composed of an n-type liquid crystal having a negative dielectric anisotropy. In this case, if at least the pixel electrode PE includes a secondary pixel electrode which is formed to extend in the row direction X, both the polar angle and the azimuth angle can be defined by the electric field, and the alignment restriction force of liquid crystal molecules can be increased, and thereby the occurrence of pooling can be suppressed. Although a detailed description is omitted, in the case of the n-type liquid crystal, since the positive/negative state of dielectric anisotropy is reversed, it is desirable that the above-described angle θ1 be in a range of 45° to 90°, preferably 70° or more.

The structure of the pixel PX is not limited to the example shown in FIG. 4, and may be variously altered.

Figure 27:
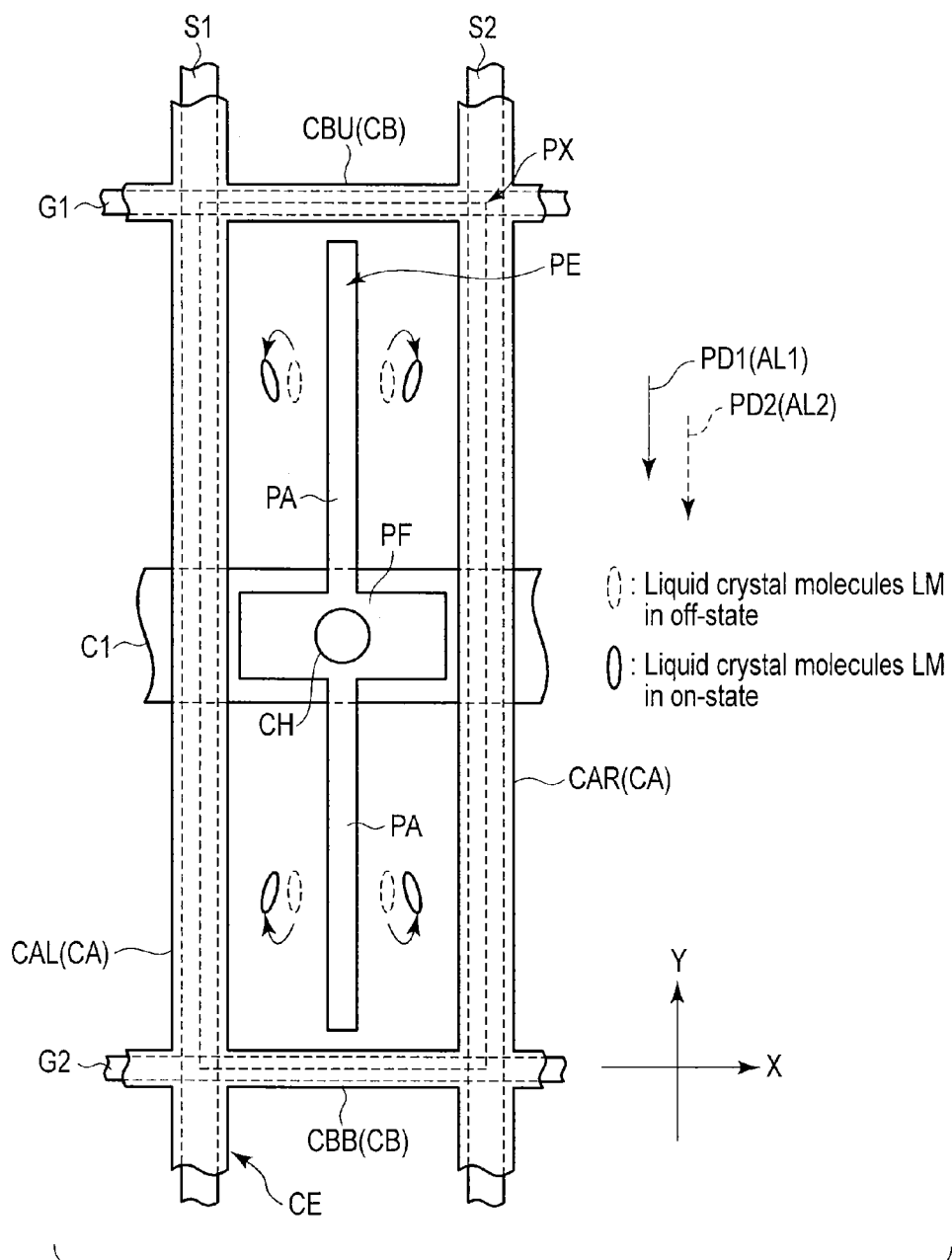
FIG. 27 is a view illustrating a modification of the structure example of the pixel shown in FIG. 4, FIG. 27 being a plan view which schematically shows another structure example of the pixel at a time when the liquid crystal display panel is viewed from the counter-substrate side.

FIG. 27 is a view illustrating a modification of the structure example of the pixel shown in FIG. 4, FIG. 27 being a plan view which schematically shows another structure example of the pixel at a time when the liquid crystal display panel LPN is viewed from the counter-substrate CT side.

As shown in FIG. 27, this structure example differs from the structure example of FIG. 4 in that the pixel electrode PE is formed in a cross shape, and that the common electrode CE is formed in a grid shape in a manner to surround one pixel PX.

Specifically, the pixel electrode PE includes a primary pixel electrode PA and a secondary pixel electrode PF which are electrically connected to each other. The primary pixel electrode PA has a longitudinal direction in the column direction Y, and linearly extends in the column direction Y from the secondary pixel electrode PF to the vicinity of an upper side end portion of the pixel PX and to the vicinity of a lower side end portion of the pixel PX. The secondary pixel electrode PF extends in the row direction X. The secondary pixel electrode PF is located in an area opposing the storage capacitance line C1, and is electrically connected to the switching element via the contact hole CH. In the example illustrated, the secondary pixel electrode PF is provided at a substantially central part of the pixel PX, and the pixel electrode PE is formed in a cross shape.

The common electrode CE includes a pair of secondary common electrodes CB which are located on both sides of the secondary pixel electrode PF in the column direction Y, and extend in the row direction X, in addition to the primary common electrodes CA. The primary common electrodes CA and secondary common electrodes CB are formed integral or continuous with each other. The secondary common electrodes CB are opposed to the scanning lines G, respectively. In the example illustrated, two secondary common electrodes CB are arranged in parallel in the row direction X. In the description below, in order to distinguish these secondary common electrodes CB, the secondary common electrode on the upper side in the Figure is referred to as "CBU", and the secondary common electrode on the lower side in the Figure is referred to as "CBB". The secondary common electrode CBU is disposed at the upper side end portion of the pixel PX, and is opposed to the scanning line G1. Specifically, the secondary common electrode CBU is disposed to extend over a boundary between the pixel PX and a pixel neighboring on the upper side. In addition, the secondary common electrode CBB is disposed at the lower side end portion of the pixel PX, and is opposed to the scanning line G2. Specifically, the secondary common electrode CBB is disposed to extend over a boundary between the pixel PX and a pixel neighboring on the lower side.

Paying attention to the positional relationship between the pixel electrode PE and the common electrode CE, the primary pixel electrode PA and the primary common electrodes CA are alternately arranged in the row direction X, and the secondary pixel electrode PF and the secondary common electrodes CB are alternately arranged in the column direction Y. Specifically, one primary pixel electrode PA is located between the neighboring primary common electrode CAL and primary common electrode CAR, and the primary common electrode CAL, primary pixel electrode PA and primary common electrode CAR are arranged in the named order in the row direction X. In addition, one secondary pixel electrode PF is located between the neighboring secondary common electrode CBB and secondary common electrode CBU, and the secondary common electrode CBB, secondary pixel electrode PF and secondary common electrode CBU are arranged in the named order in the column direction Y. The liquid crystal layer LQ is formed of a p-type liquid crystal material.

According to this structure example, the liquid crystal molecules LM, which are initially aligned in the column direction Y at the OFF time, are affected by the electric field which is produced between the pixel electrode PE and common electrode CE at the ON time, and the major axes thereof rotate within a plane which is substantially parallel to the X-Y plane, as indicated by continuous lines in the Figure. The liquid crystal molecule LM in a region surrounded by the pixel electrode PE, primary common electrode CAL and secondary common electrode CBB rotates clockwise relative to the column direction Y, and is aligned in a lower left direction in the Figure. The liquid crystal molecule LM in a region surrounded by the pixel electrode PE, primary common electrode CAR and secondary common electrode CBB rotates counterclockwise relative to the column direction Y, and is aligned in a lower right direction in the Figure. The liquid crystal molecule LM in a region surrounded by the pixel electrode PE, primary common electrode CAL and secondary common electrode CBU rotates counterclockwise relative to the column direction Y, and is aligned in an upper left direction in the Figure. The liquid crystal molecule LM in a region surrounded by the pixel electrode PE, primary common electrode CAR and secondary common electrode CBU rotates clockwise relative to the column direction Y, and is aligned in an upper right direction in the Figure.

In this manner, in each pixel PX, in the state in which an electric field is produced between the pixel electrode PE and common electrode CE, a greater number of domains can be formed than in the example shown in FIG. 4, and the viewing angle can be increased. In addition, the alignment restriction force of liquid crystal molecules can be made stronger than in the example shown in FIG. 4.

In the structure of the pixel PX shown in FIG. 27, the liquid crystal layer LQ may be formed of an n-type liquid crystal material. In this case, too, a sufficiently high alignment restriction force of liquid crystal molecules can be obtained.

The common electrode CE may include additional electrodes. The pixel PX shown in FIG. 4 and FIG. 5 is described by way of example. The common electrode CE may include second primary common electrodes (shield electrodes) which are provided on the array substrate AR and are opposed to the primary common electrodes CA (or opposed to the signal lines S), in addition to the primary common electrodes CA provided on the counter-substrate CT. The second primary common electrodes extend substantially in parallel to the primary common electrodes CA and have the same potential as the primary common electrodes CA. By providing the second primary common electrodes, an undesired electric field from the signal lines S can be shielded.

Furthermore, the common electrode CE may include secondary common electrodes (shield electrodes) which are provided on the array substrate AR and are opposed to the scanning lines G and storage capacitance line C, in addition to the primary common electrodes CA provided on the counter-substrate CT. The secondary common electrodes extend in a direction crossing the primary common electrodes CA, and have the same potential as the primary common electrodes CA. By providing these secondary common electrodes, an undesired electric field from the scanning lines G and storage capacitance line C can be shielded. According to the structure including such second primary common electrodes and secondary common electrodes, degradation in display quality can further be suppressed.

The above-described example relates to the liquid crystal display device which adopts a lateral electric field mode or an oblique electric field mode by a method different from an IPS (In-Plane Switching) mode. The display mode of the liquid crystal display device, however, is not limited to the above-described example, and may be various altered. For example, the liquid crystal display device may also adopt a VMW (Versatile Mobile Window) mode, an FFS (Fringe Field Switching) mode and a TN (Twisted Nematic) mode. In this case, too, the same advantageous effects as described above can be obtained.

Even when the liquid crystal display device adopts a normally white mode, the same advantageous effects as described above can be obtained. In this case, the voltage level which is possessed by the precharge signal is a voltage value of a video signal for black display.

No matter whether the voltage level that is possessed by the precharge signal is higher than the highest voltage value of the positive-polarity video signal or deeper than the deepest voltage value of the negative-polarity video signal, the occurrence of vertical crosstalk can be reduced. In addition, although there is a concern that the effect of reducing the occurrence of vertical crosstalk is not so greatly obtained as in the above-described embodiment, the occurrence of vertical crosstalk can be reduced no matter whether the voltage level that is possessed by the precharge signal is lower than the highest voltage value of the positive-polarity video signal or shallower than the deepest voltage value of the negative-polarity video signal.

What is claimed is:

1. A liquid crystal display device comprising:
an array substrate comprising first to third signal lines, first to third pixel electrodes, a first thin-film transistor including a first semiconductor layer including a source region electrically connected to the first signal line and a drain region electrically connected to the first pixel electrode, a second thin-film transistor including a second semiconductor layer including a source region electrically connected to the second signal line and a drain region electrically connected to the second pixel electrode, and a third thin-film transistor including a third semiconductor layer including a source region electrically connected to the third signal line and a drain region electrically connected to the third pixel electrode;
a counter-substrate comprising a common electrode which is set at a constant potential, the counter-substrate being arranged opposite to the array substrate with a gap;
a liquid crystal layer which is held between the array substrate and the counter-substrate and on which an electric field produced between the first to third pixel electrodes and the common electrode acts; and
a signal line driver which is electrically connected to the first to third signal lines, and is configured to deliver first video signals of a positive polarity and a negative polarity to the first signal line, deliver second video signals of the positive polarity and the negative polarity to the second signal line, and deliver third video signals of the positive polarity and the negative polarity to the third signal line,
wherein, in every 1 horizontal scanning period, the signal line driver is configured to:
simultaneously deliver, prior to delivering the first to third video signals to the first to third signal lines, precharge signals of the same polarity to the first to third signal lines, the precharge signals having a voltage level which is different from an intermediate voltage value between the first to third video signals of the positive polarity and the first to third video signals of the negative polarity;
deliver the first video signal to the first signal line after delivering the precharge signals;
deliver the second video signal to the second signal line after delivering the first video signal to the first signal line; and
deliver the third video signal to the third signal line after delivering the second video signal to the second signal line.

2. The liquid crystal display device of claim 1, wherein the voltage level which is possessed by the precharge signals is in a range of between a highest voltage value of the first to third video signals of the positive polarity and a deepest voltage value of the first to third video signals of the negative polarity.

3. The liquid crystal display device of claim 2, wherein the voltage level which is possessed by the precharge signals is either the highest voltage value or the deepest voltage value.

4. The liquid crystal display device of claim 1, wherein the liquid crystal display device is configured to adopt a normally black mode, and the voltage level which is possessed by the precharge signal is a voltage value of the first to third video signals for white display.

5. The liquid crystal display device of claim 1, wherein the precharge signals are precharge signals of the same voltage level.

6. The liquid crystal display device of claim 1, wherein the first to third pixel electrodes include primary pixel electrodes, respectively, each of the primary pixel electrodes having a major axis, the common electrode includes a plurality of primary common electrodes extending in a direction along the major axis, and the plurality of primary common electrodes and the primary pixel electrodes are alternately arranged in a direction perpendicular to the major axis.

7. The liquid crystal display device of claim 6, wherein the first to third pixel electrodes further include secondary pixel electrodes, respectively, which are connected to the primary pixel electrodes and extend in the direction perpendicular to the major axis.

8. The liquid crystal display device of claim 7, wherein the primary pixel electrode and the secondary pixel electrode of each of the first to third pixel electrodes intersect with each other and are formed in a cross shape.

9. The liquid crystal display device of claim 7, wherein the common electrode further includes a plurality of secondary common electrodes which extend in the direction perpendicular to the major axis, and the plurality of secondary common electrodes and the secondary pixel electrodes are alternately arranged in the direction along the major axis.

* * * * *